United States Patent [19]

Trussell et al.

[11] 4,027,532
[45] June 7, 1977

[54] COMPRESSION TESTING APPARATUS

[75] Inventors: Gerald C. Trussell, Park Ridge; Robert W. Arnston, Schaumburg, both of Ill.

[73] Assignee: Sun Electric Corporation, Chicago, Ill.

[22] Filed: Apr. 20, 1976

[21] Appl. No.: 678,670

[52] U.S. Cl. .............................. 73/117.2; 235/151.3
[51] Int. Cl.² ....................................... G01M 15/00
[58] Field of Search ................ 73/117.2, 116, 115; 235/151.3; 324/19

[56] References Cited

UNITED STATES PATENTS

| | | | |
|---|---|---|---|
| 3,765,233 | 10/1973 | Germann | 73/117.2 |
| 3,839,906 | 10/1974 | Hanson | 73/115 |
| 3,938,378 | 2/1976 | Fineman et al. | 73/117.2 |

*Primary Examiner*—Jerry W. Myracle
*Attorney, Agent, or Firm*—Allegretti, Newitt, Witcoff & McAndrews

[57] ABSTRACT

The disclosure describes apparatus for determining the relative compression of the chambers of an internal combustion engine by analyzing the voltage or current waveform of the starter system during cranking. The waveform is rapidly and repetitively sampled by an analog-to-digital converter which converts the amplitude waveform into corresponding digital signals. A processor selects one of the signals having either a maximum or minimum value to represent each of the chambers. The processor automatically determines the number of chambers in the engine, determines the relative compression of the chambers and displays the result to the operator of the system.

34 Claims, 42 Drawing Figures

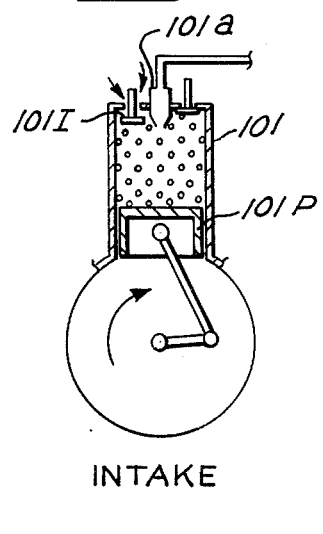
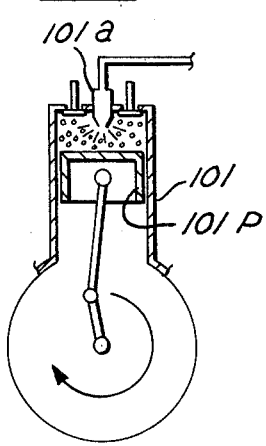
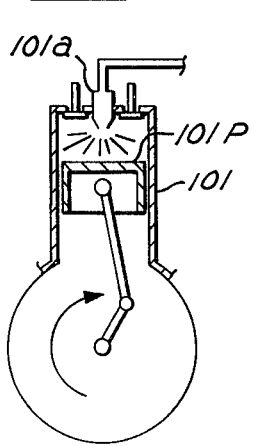
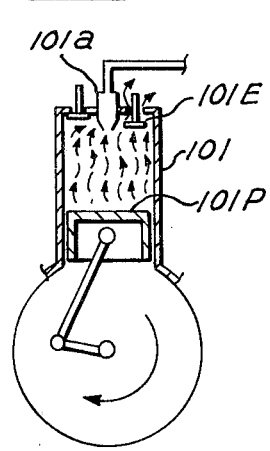
INTAKE • COMPRESSION & SPARK • POWER • EXHAUST
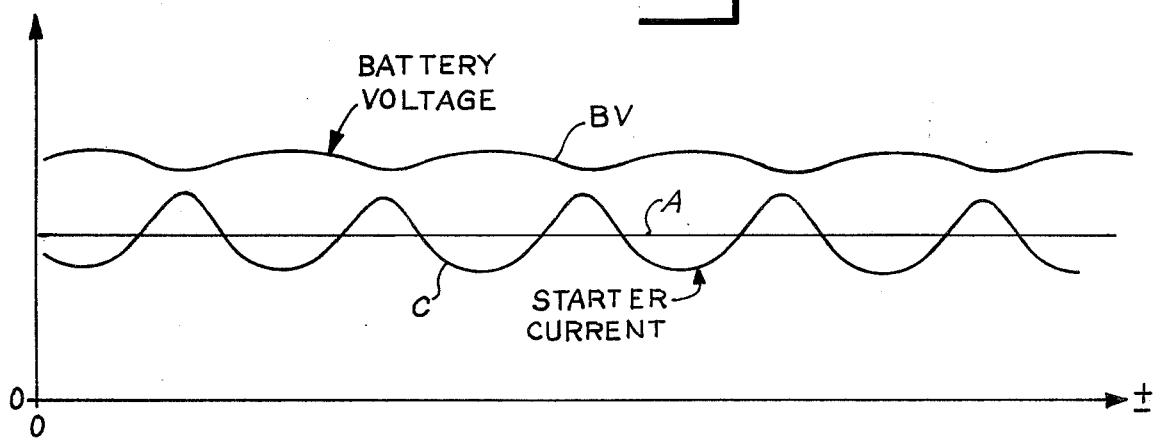

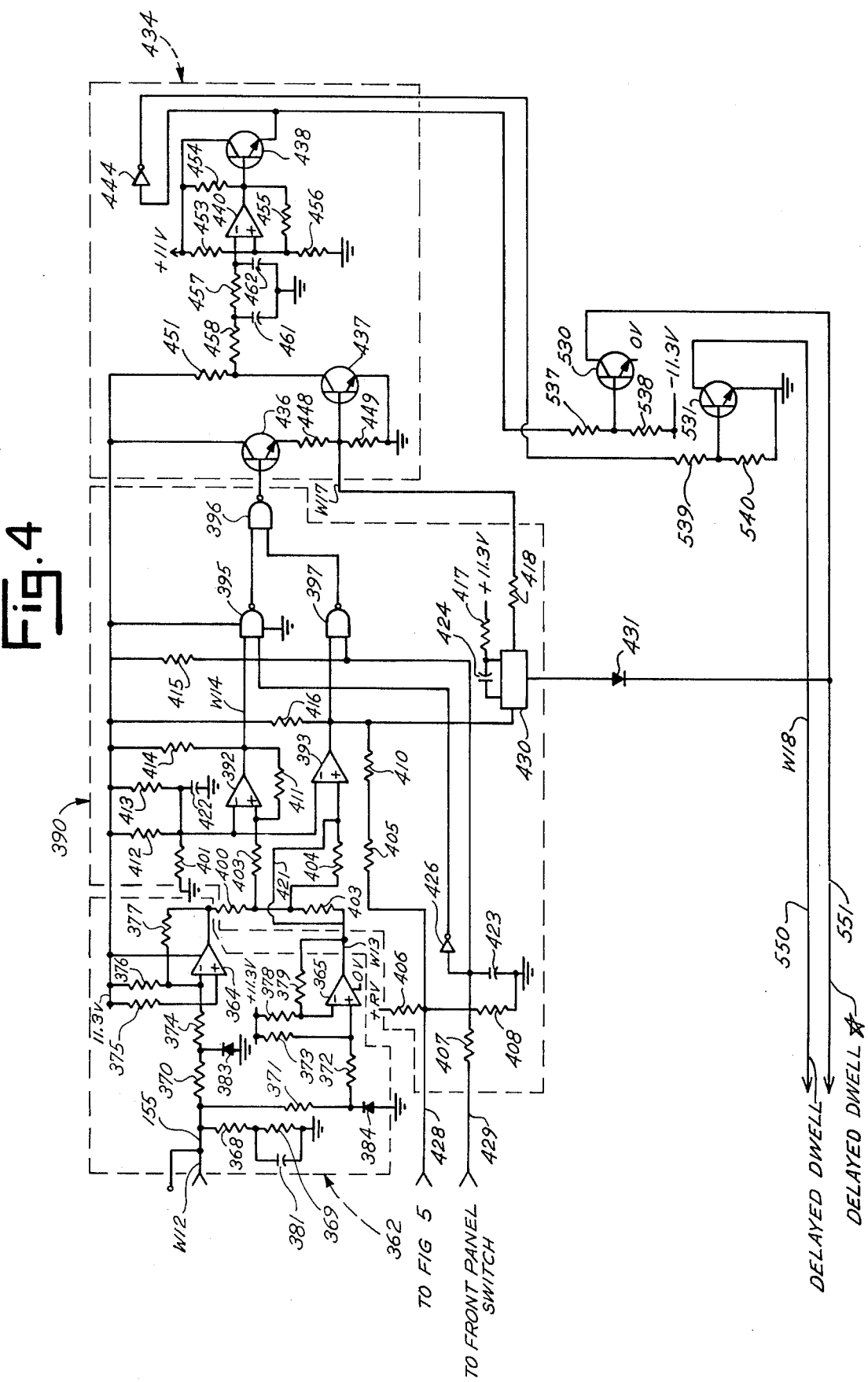

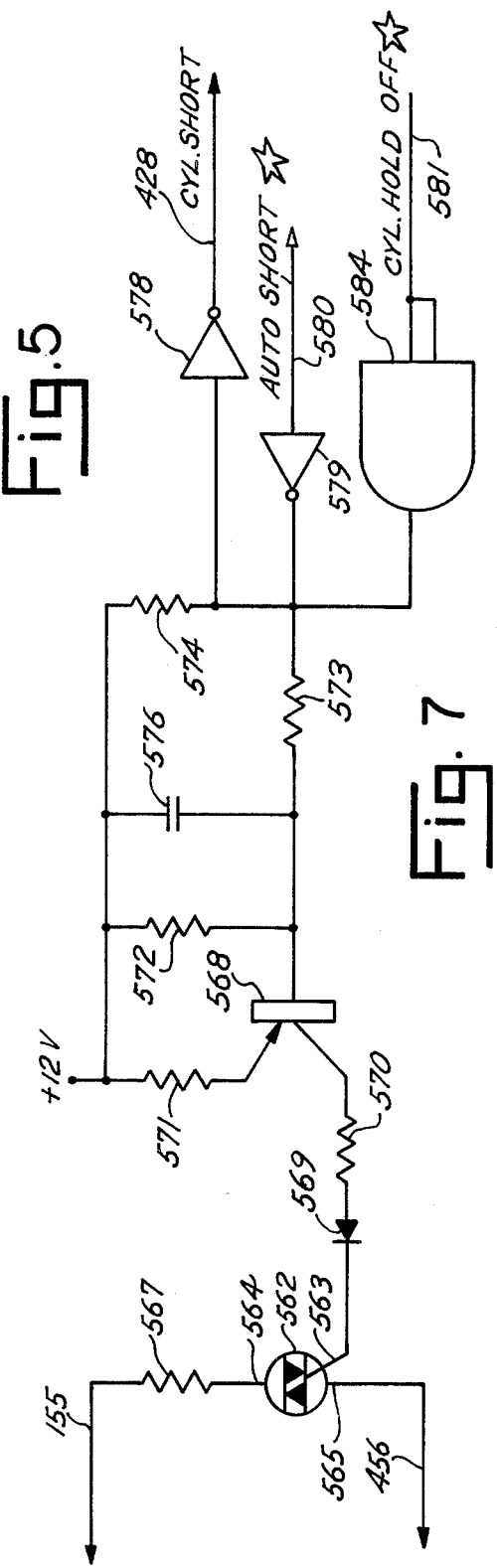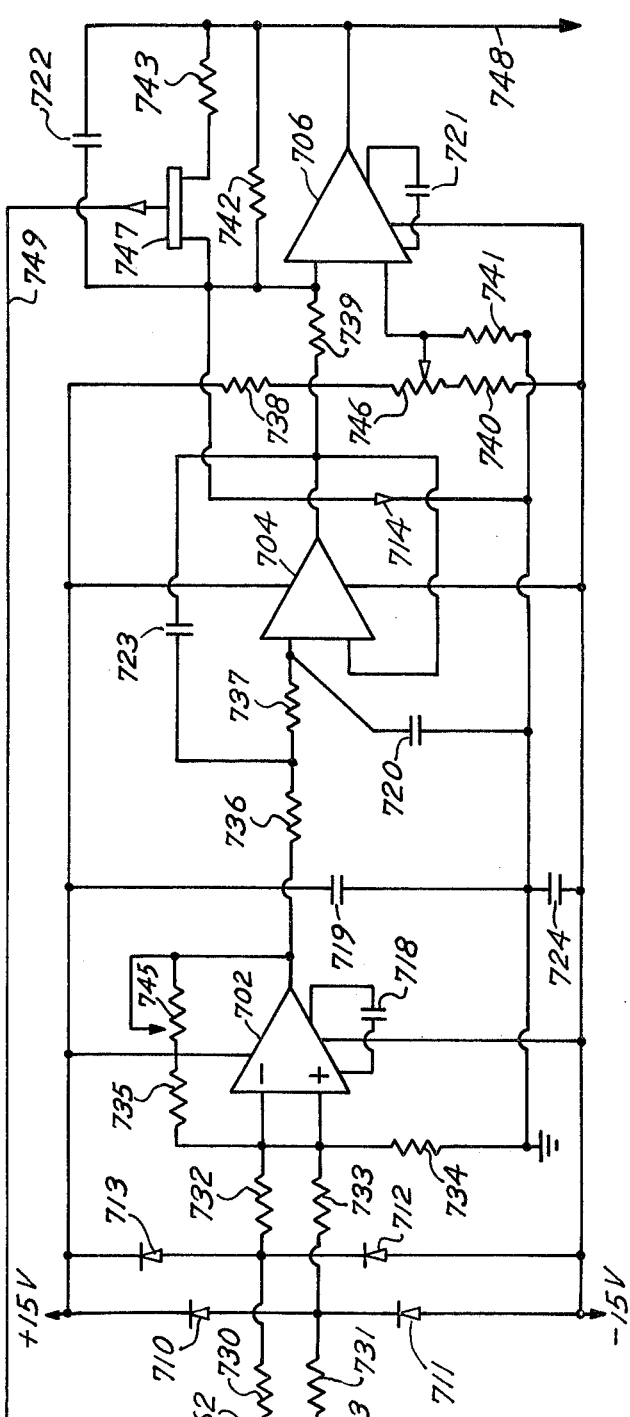

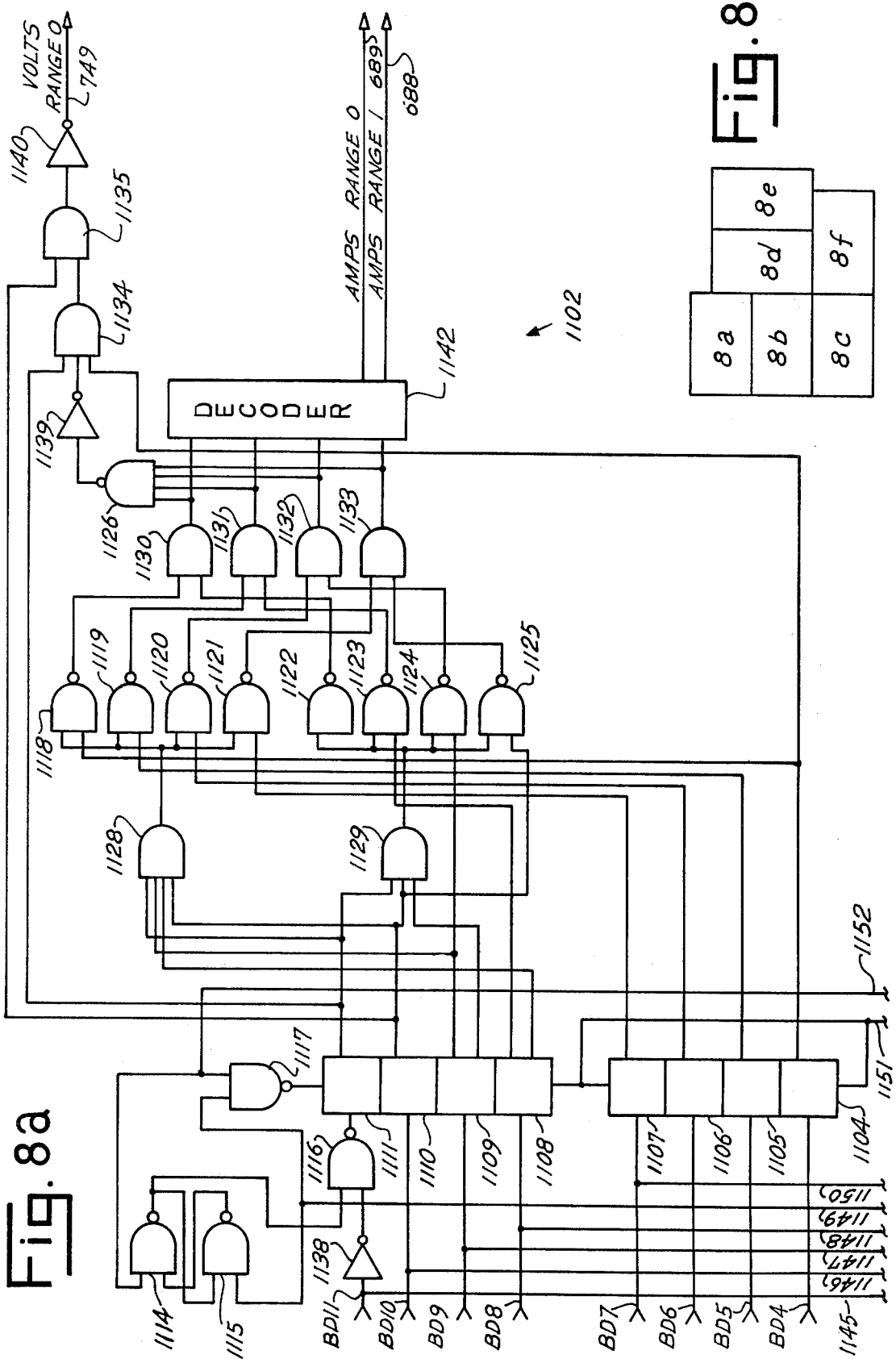

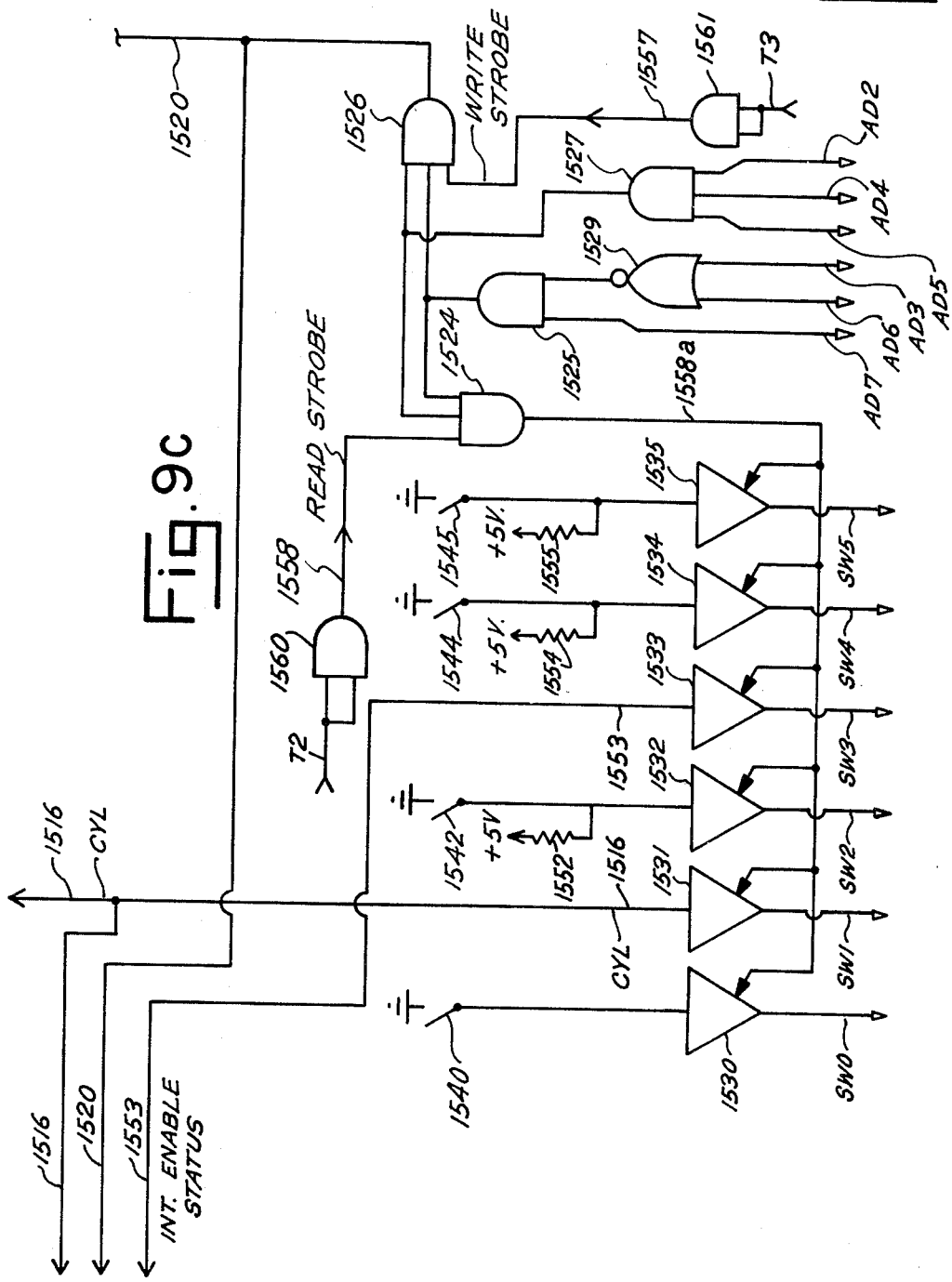
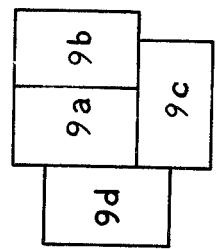

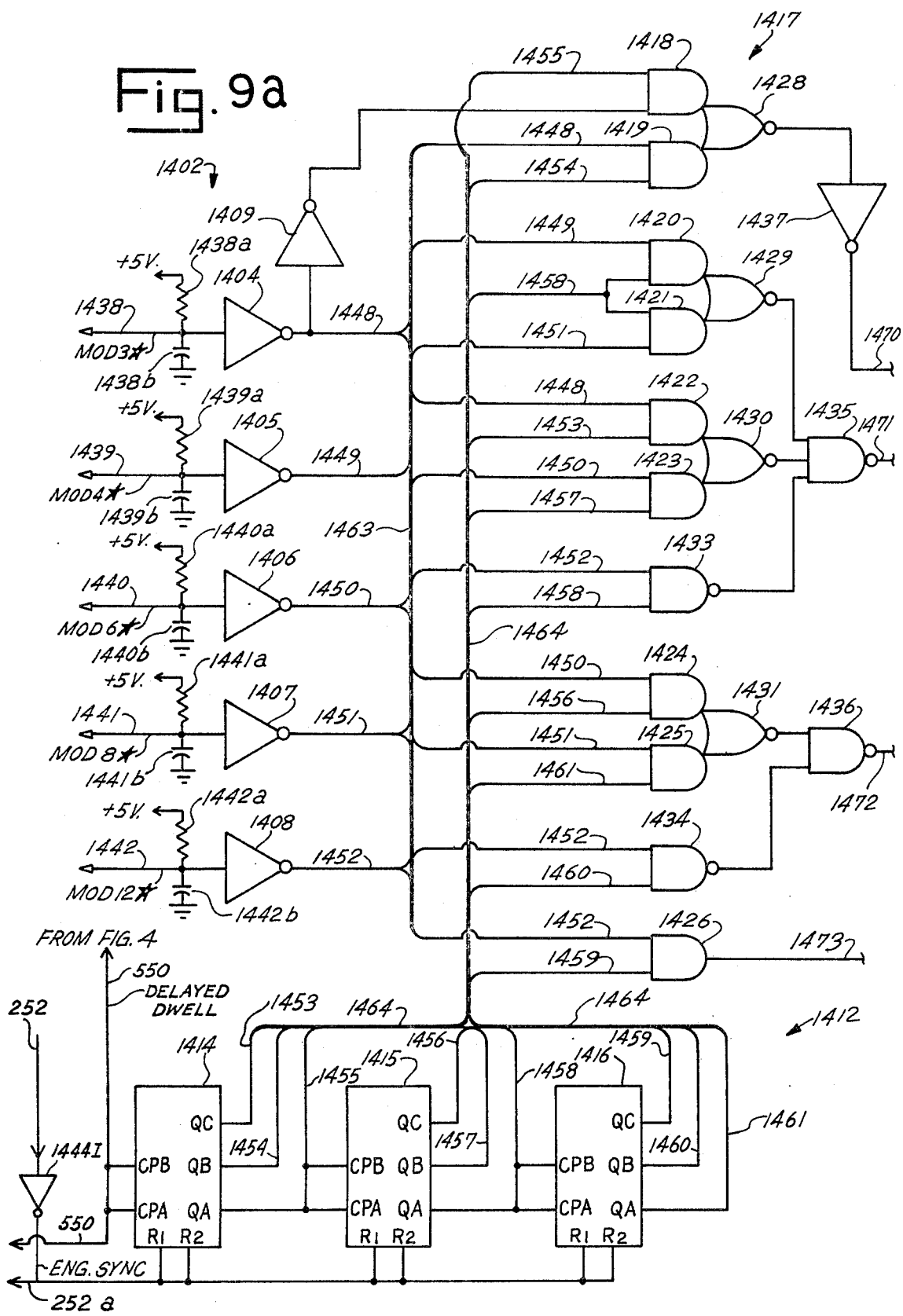

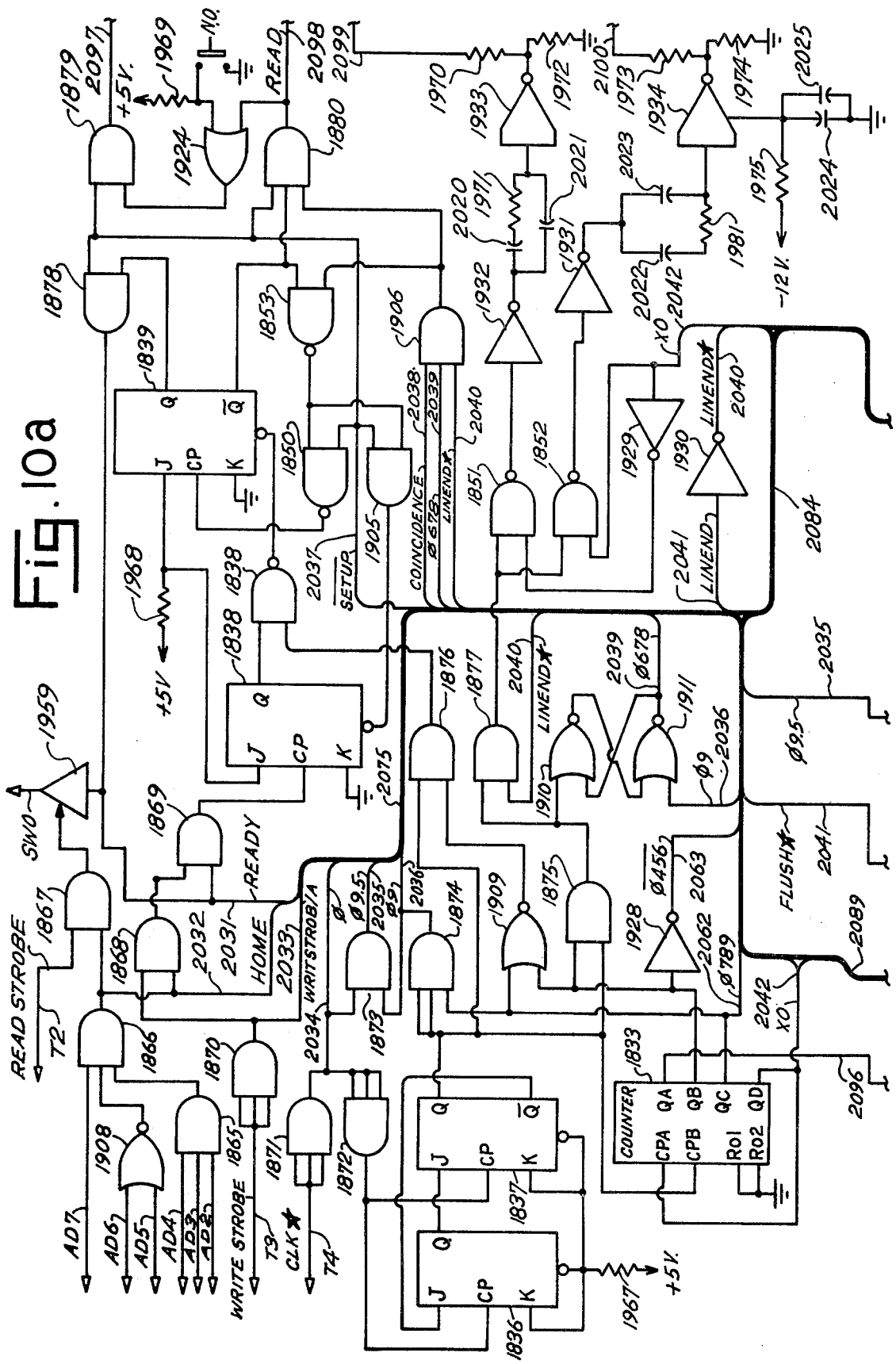

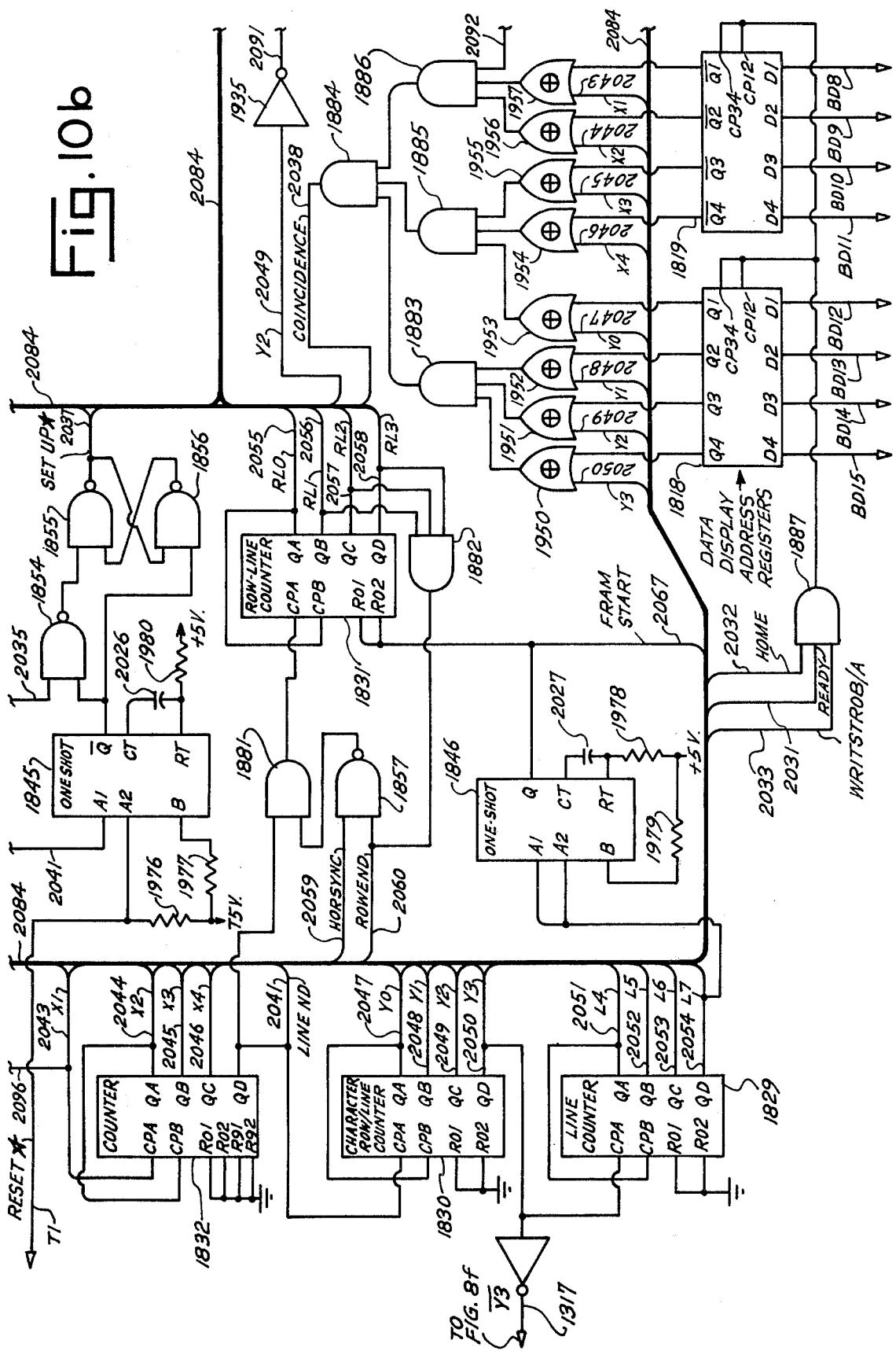

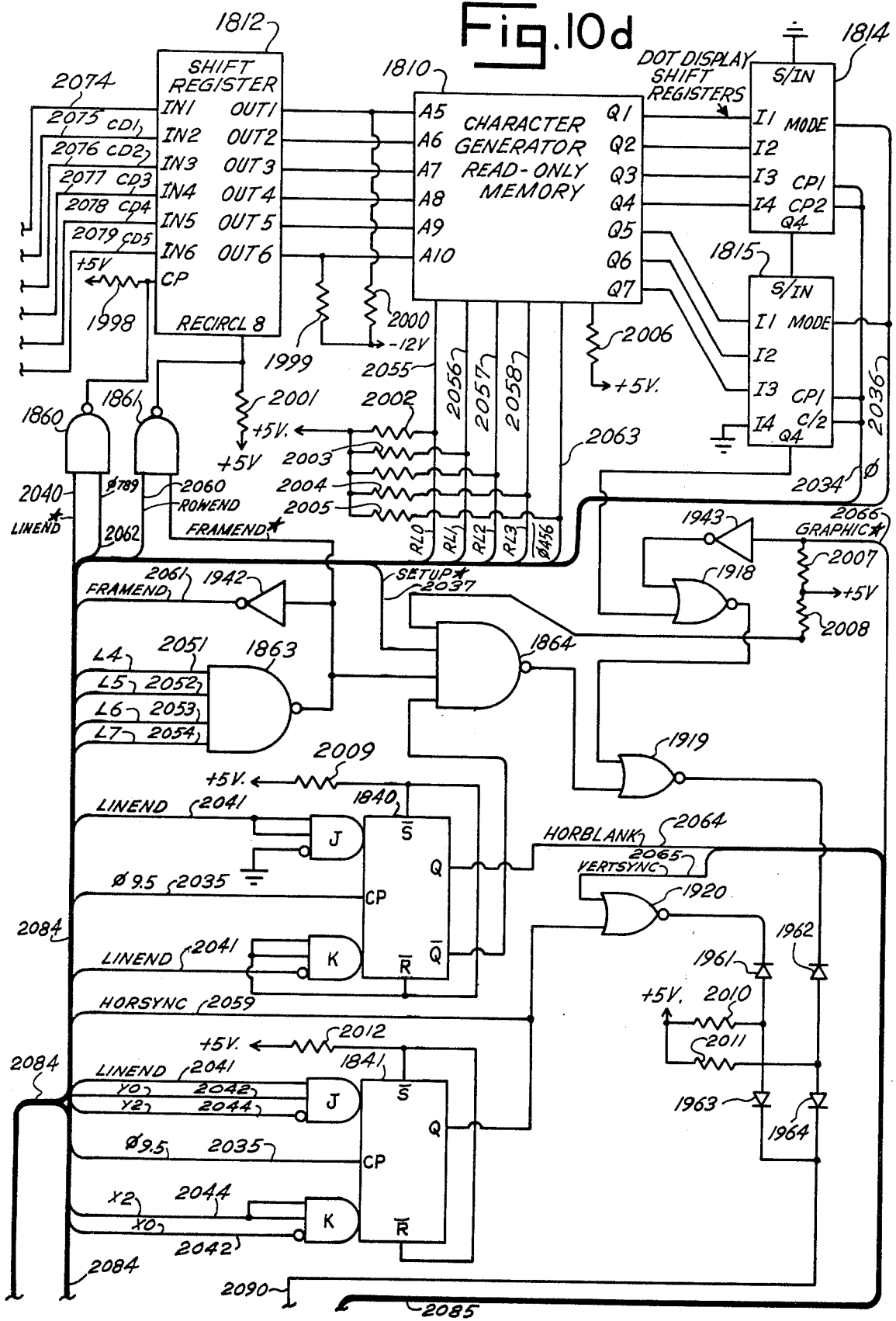

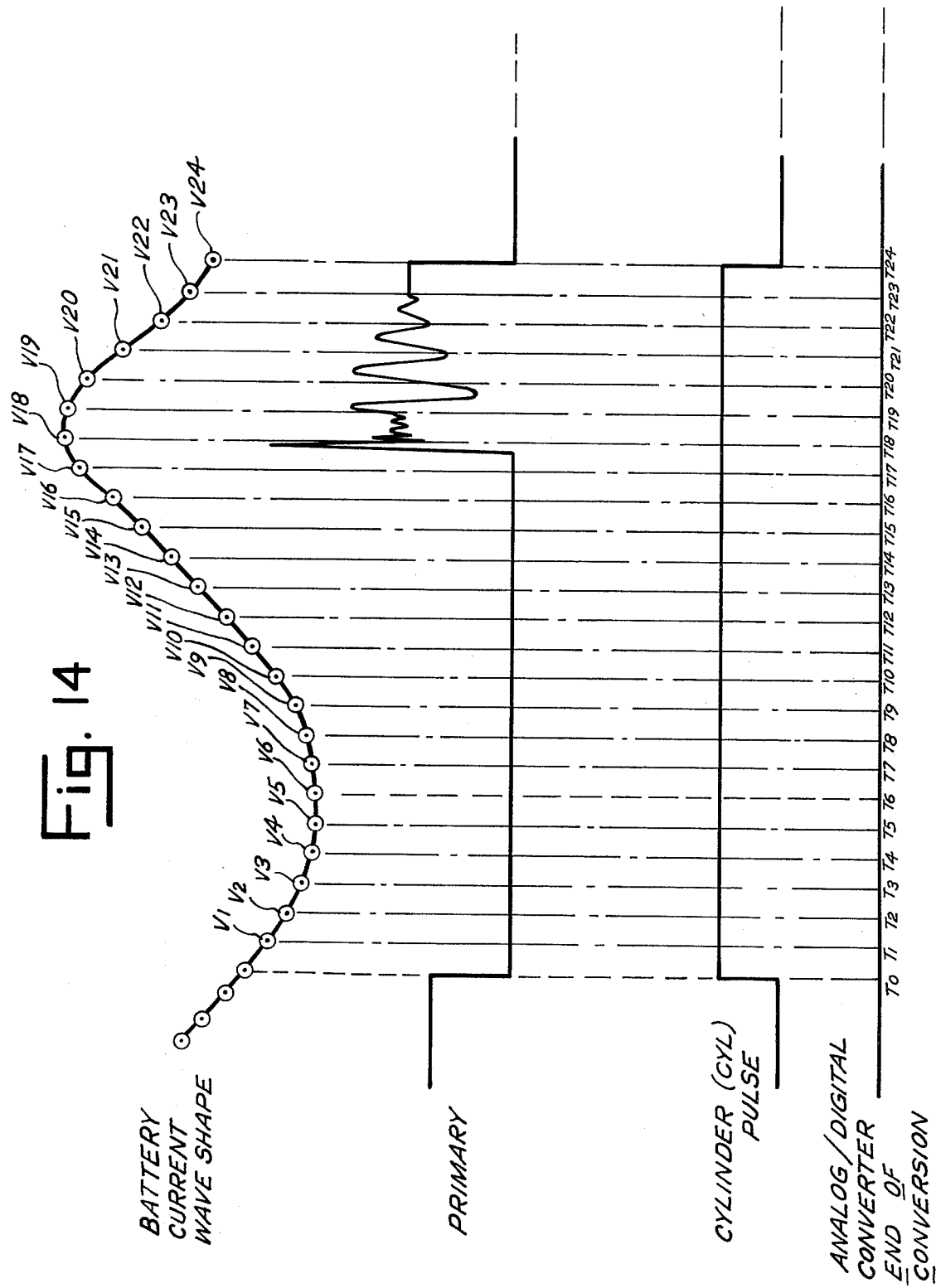

COMPRESSION TESTING APPARATUS

BACKGROUND AND SUMMARY OF THE INVENTION

This invention relates to devices for testing the compression of internal combustion engines, and more particularly relates to techniques for compression testing by analyzing the waveform of the starter current or voltage of an internal combustion engine.

Many internal combustion engines have an electrical starting system including a starter motor which draws current from a battery in order to turn or crank the engine until it starts. The starting motor voltage and current waveforms vary in proportion to the work done as the air-fuel mixture in each engine cylinder or chamber is compressed during cranking. The greater the compression produced by a cylinder, the greater the voltage drop and the greater the current flow from the battery to the starter. If a cylinder is leaking, and therefore has low compression, the starter does not need to work as hard in order to compress the air-fuel mixture in the cylinder. As a result, the voltage drop and current flow during the compression stroke of a leaking cylinder is lower than the voltage drop and current flow during the compression stroke of a normal cylinder.

Various devices have been devised in the past to check engine compression using the foregoing principles. For example, one compression tester said to be developed by Mobil Research and Development Corporation produces a waveform on a strip chart corresponding to the current flow in the starter. Before the chart can be used, it must be subjectively analyzed by a highly trained person capable of accurately evaluating the waveforms. This requirement severely limits the acceptability of the chart and increases the expense of using it.

U.S. Pat. No. 3,765,233 (German - Oct. 16, 1973) describes a device in which the percentage of the maximum compression of the engine may be figured out with respect to any cylinder by manually adjusting a potentiometer. However, this process requires considerable time and effort on the part of the operator.

U.S. Pat. No. 3,839,906 (Hanson - Oct. 8, 1975) describes test apparatus which indicates cylinders having a compression below a predetermined reference value. However, the apparatus does not appear to provide any means for indicating the precise relative compression between the various cylinders of an engine.

The present invention overcomes the defects inherent in the prior art devices which rely primarily on analog circuits in order to perform the limited analysis of which they are capable. The present invention employs a novel digital approach in which a group of discrete digital amplitude signals having values proportional to the amplitude of an electrical power signal supplied to the starter of an engine are generated for each chamber of the engine. A processor then selects from each group of digital amplitude signals a representative signal for each chamber of the engine. The representative signals then are analyzed digitally in order to display to the operator the relative compression of the engine chambers. According to another feature of the invention, timing signals identify the order in which the discrete digital amplitude signals are generated. By using the timing signals, the representative signal for each chamber can represent the maximum value or minimum value of the amplitude signal in each group depending on the order in which the maximum or minimum values are generated. By using this approach, the relative compression of the engine chambers can be evaluated with a degree of accuracy heretofore unavailable. In addition, the processor is capable of performing complex analysis which aids the operator to accurately and efficiently determine the status of the engine compression.

According to a further feature, the number of chambers automatically is determined and the engine ignition then is disabled so that the compression of the chambers can be evaluated during cranking.

DESCRIPTION OF THE DRAWINGS

These and other advantages and features of the present invention will hereafter appear in connection with the accompanying drawings, wherein like numbers refer to like parts throughout, and wherein:

FIGS. 1a–1d illustrate the four stroke cycle of the number 1 cylinder of the engine shown in FIG. 1;

FIG. 2 illustrates the battery voltage and starter current of an electrical power signal transmitted from the battery to the starter motor of the engine shown in FIG. 1;

FIG. 4 is a schematic diagram of a preferred form of primary interface circuit made in accordance with the present invention;

FIG. 5 is a schematic diagram of a preferred form of shorting control circuit made in accordance with the present invention;

FIG. 7 is a schematic diagram of a voltmeter circuit made in accordance with the present invention;

FIG. 8 illustrates the manner in which FIGS. 8a–8f should be arranged;

FIGS. 8a–8f are schematic diagrams of a preferred form of analog system made in accordance with the present invention;

FIG. 9 illustrates the manner in which FIGS. 9a–9d should be arranged;

FIGS. 9a–9d are schematic diagrams of a preferred form of cylinder selection circuit made in accordance with the present invention;

FIG. 10 illustrates the manner in which FIGS. 10a–10e should be arranged;

FIGS. 10a–10e are schematic diagrams of a preferred form of character control made in accordance with the present invention;

FIG. 14 illustrates a portion of the starter current waveform shown in FIG. 1 in relationship to the primary signal generated by the ignition system shown in FIG. 2 and in relationship to the cylinder (CYL) voltage pulse generated by the circuit shown in FIGS. 9a–9c.

DESCRIPTION OF THE PREFERRED EMBODIMENT

Introduction

Figure 1:
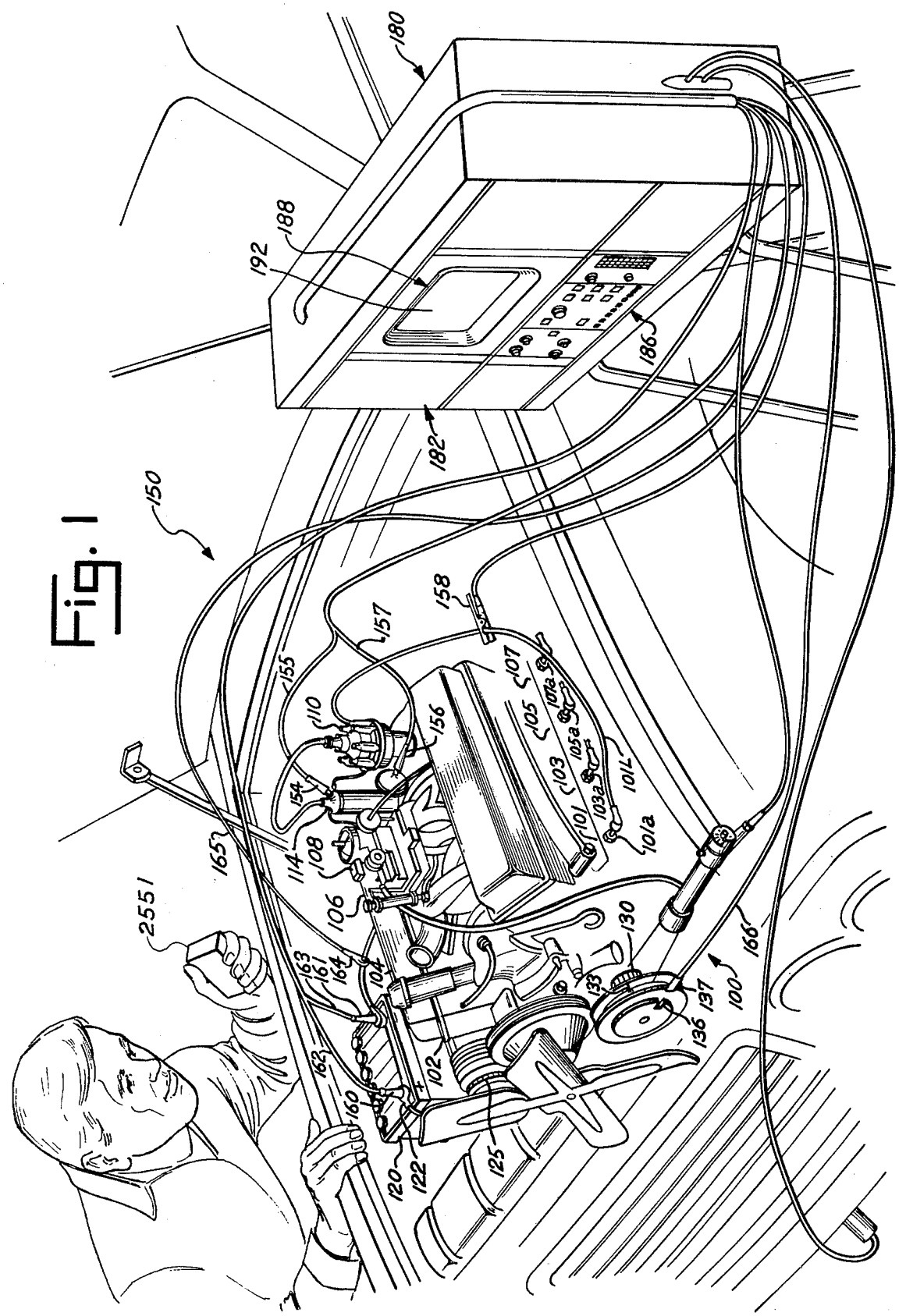
FIG. 1 is a persepctive view of an internal combustion engine that is connected to a preferred form of the present invention.
Figure 2A:
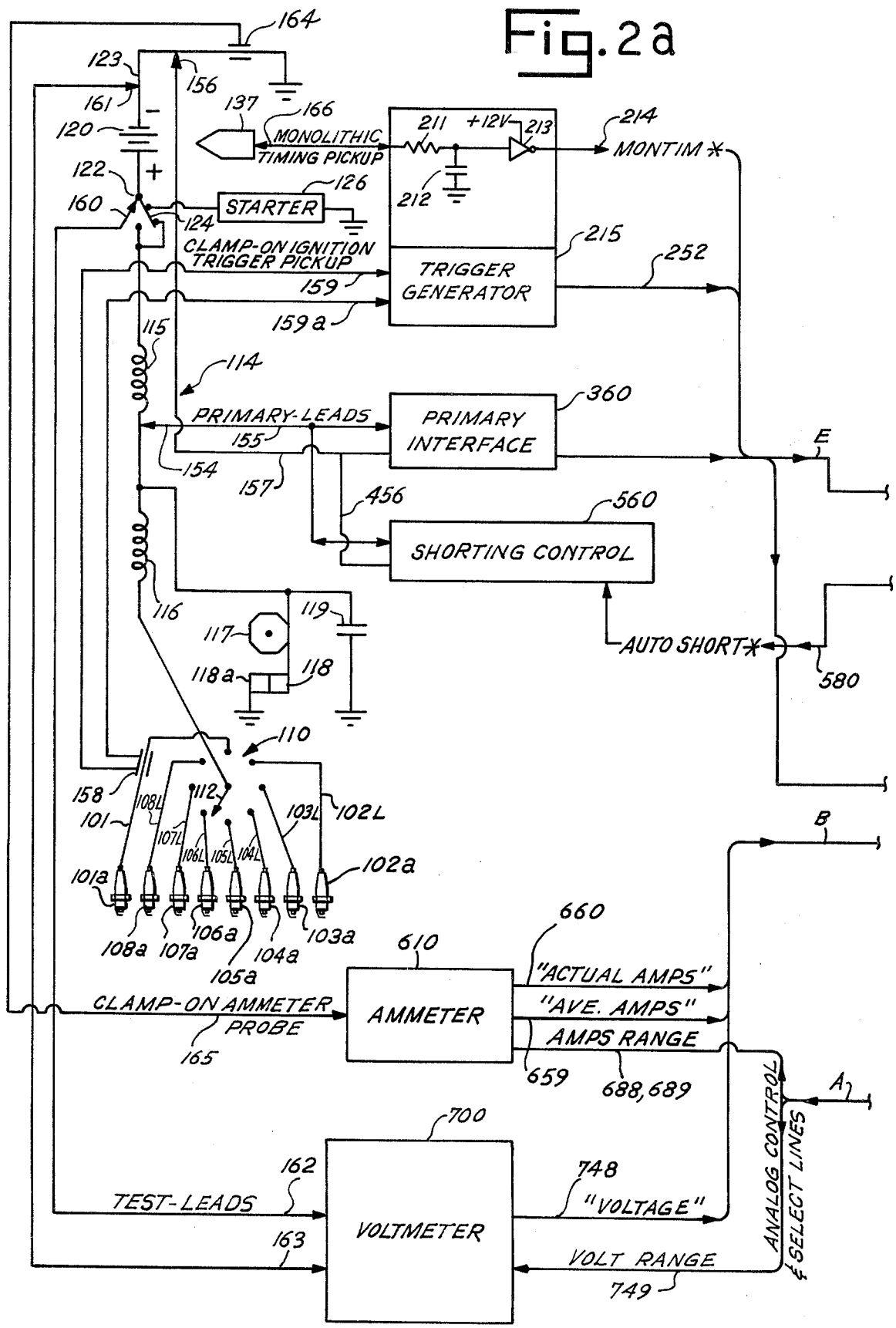
FIGS. 2a and 2b are schematic diagrams of an ignition system of the engine shown in FIG. 1 connected to a system block diagram of a preferred form of the present invention.

Referring to FIGS. 1, 1a–1d, 2a and 2b, the compression of an exemplary V-8 internal combustion engine 100 can be analyzed by the present invention. A schematic diagram of the ignition system of engine 100 is shown in FIG. 2a.

Engine 100 comprises cylinders or ignition chambers 101–108 which are fitted with spark plugs or ignitors 101a–108a and movable members or pistons which compress gas inside the chambers.

FIGS. 1a–1d illustrate a typical operating cycle of exemplary cylinder 101. In FIG. 1a, an air-fuel mixture is drawn into the cylinder through an intake valve 101I as piston 101P is moving downward. The air-fuel mixture is compressed by the upward movement of the piston until spark plug 101a fires at the position of the piston shown in FIG 1b (e.g., 6° before the top dead center position). The fuel-air mixture then explodes, and the piston is driven down as shown in FIG. 1c. Exhaust valve 101E then opens and the exhaust gases are expelled as the piston moves upward (FIG. 1d).

If engine 100 were a diesel engine, spark plugs 101 would be replaced by fuel injectors which would provide a combustion means for creating the combustion of fuel in the cylinders. If the piston were moved upward to the position shown in FIG. 1b, the injector would spray a charge of fuel into the cylinder. The heat of the compressed air would cause the fuel to explode and drive the piston down (FIG. 1c).

The invention also can be used with a Wankel-type engine which uses firing chambers rather than cylinders.

Referring to FIG. 2a, spark plugs 101a–108a are connected to a distributor 110 by spark plug leads 101L–108L, respectively. Distributor 110 includes a rotor 112 which distributes high voltage ignition signals to each of the spark plugs in a defined sequence. The rotor receives high voltage ignition signals from a coil assembly 114 comprising a primary coil 115 that is magnetically coupled to a secondary coil 116. Voltage signals are generated in the primary coil by an eight-sided cam 117 which is mechanically rotated in synchronism with engine 100 in order to periodically open and close contact points 118, 118a. A conventional distributor capacitor 119 is connected across contact points 118, 118a. The primary coil voltage induces in the secondary coil high voltage ignition or firing signals or pulses which fire the spark plugs sequentially.

Electrical power is supplied to the ignition system by a conventional 12 volt battery 120 having a positive terminal 122 and a negative terminal 123. An ignition switch 124 is connected in series between the battery and primary coil 115, and an alternator 125 charges battery 120. A starter motor 126 receives an electrical power signal from battery 120 during a starting period when the ignition switch is in the position shown. During the starting period, the starter motor rotates the engine and moves the pistons relative to the cylinders in the manner shown in FIGS. 1l–1d. As each piston moves upward to compress the gas-air mixture in the associated cylinder, the voltage across battery 120 decreases and the current through the battery increases. The waveforms of current and voltage for a typical electrical power signal are schematically shown by curves C and BV of FIG. 2. These waveforms are measured and analyzed by the present invention in order to determine the relative compression of engine 100.

Although engine 100 is shown with a conventional mechanical contact point ignition system, it should be understood that the present invention can be used to diagnose more sophisticated ignition systems in which electronic or semi-conductor switches are used in place of contacts 118, 118a.

Engine timing marks 130 are fixed to the block of the engine and cooperate with a damper mark 133 on the rotating engine vibration damper 132 in order to properly time the firing of the spark plugs. The engine damper also can include a slot 136, the position of which can be detected by a conventional magnetic pick-up 137 that produces a change in voltage when slot 136 moves past the location of the pick-up. Such devices are well known in the art and need not be described in detail. Basically, they comprise an electronic circuit typically fabricated on a single or monolithic chip of silicon, and are therefore, commonly referred to as "monolithic" pick-ups.

A preferred form of the present invention which can be used to analyze the compression of an engine of the above-described type basically comprises a cable assembly 180, a display monitor 190, including a cathode ray tube (CRT) face 192, a monolithic input circuit 210, a trigger generator 215, a primary interface circuit 360, a shorting control circuit 560, an ammeter circuit 610, a voltmeter circuit 700, a data processor 1090, a read-only memory 1094, a processing bus 1096, an analog control system 1100, a counting and cylinder control system 1400 and a character controller 1800.

Related components are descibed in U.S. application Ser. No. 641,342, now abandoned, entitled "Engine Test and Display Apparatus", filed December 16, 1975 in the names of Cashell et al. Some of the components described in that application have been modified by the present inventors in order to implement the present invention.

Cable Assembly 150

Referring to FIGS. 1 and 2a, cable assembly 150 comprises a primary clip 154 and a lead 155, as well as a clip 156 and a lead 157 which are connected to chassis ground.

A clamp-on trigger pick-up 158 normally is clipped around the spark plug lead for the number 1 cylinder (e.g., lead 101L) and generates a synchronizing signal each time the number 1 spark plug (i.e., plug 101a) is fired. The signals are transmitted through conductos 159, 159a to the trigger generator.

Tests clips 160, 161, which conduct signals through leads 162 and 163, respectively, are normally connected to the battery with the polarity shown.

An ammeter probe 164 is normally connected around one lead of battery 120. The probe is a Hall-effect tranducer that can be used to sense the fluctuations in the dc current flowing into or out of the battery. The probe has polarity indicator which is necessary to determine the direction of current flow. Such devices are well known in the art and need not be described in detail. The signal generated by the ammeter probe is conducted to the ammeter circuit by lead 165.

A lead 166 is connected from the monolithic timing pick-up 137 to the monolithic input circuit 210.

Case Assembly 180

Referring to FIG. 1, case assembly 180 comprises a front panel 182 including a control switch assembly 186 which performs various input control functions.

The case assembly is fitted around a conventional display monitor 190, such as Model XM-702-72 manufactured by Motorola Corp., Chicago, Ill. The monitor has a cathode ray tube with a display face 192, for displaying data in alphabetic and numeric form.

Monolithic Input Circuit 210

Monolithic input circuit 210 comprises a resistor 211, a capacitor 212, an inverting amplifier 213, and an output conductor 214, connected as shown. (FIG. 2a).

Trigger Generator 215

Trigger Generator 215 is used to generate an ENG. SYNC* pulse at the time the No. 1 cylinder of the engine is fired. (Throughout this specification, an asterisk (*) is used to identify the inverse or complement of a pulse or signal identified without an asterisk.)

Figure 3:
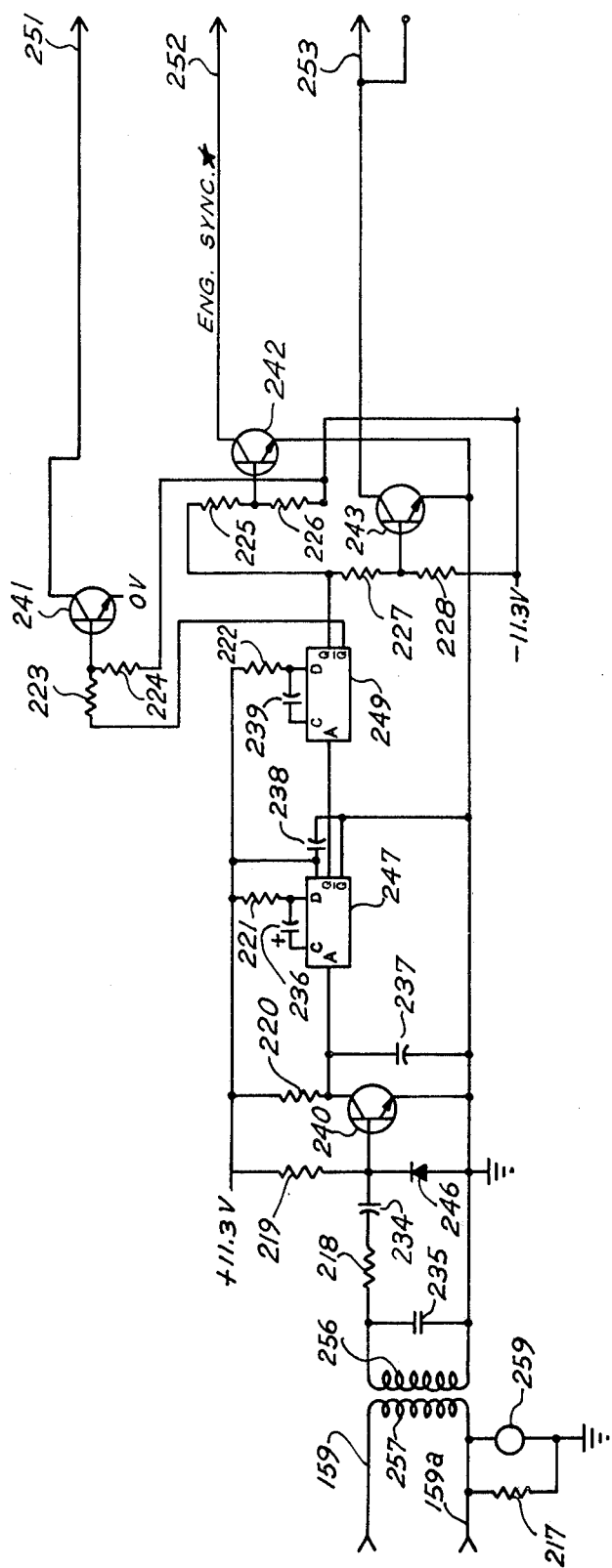
FIG. 3 is a schematic diagram of a preferred form of trigger generator made in accordance with the present invention.

Referring to FIG. 3, the trigger generator comprises resistors 217–228, capacitors 234–239, transistors 240–243 and a diode 246, connected as shown. A 9 millisecond one-shot multivibrator 247 and a 1.3 millisecond one-shot multivibrator 249 are used to suppress noise which may be picked upon the input to the trigger generator. Output conductor 251 provides an ENG. SYNC pulse when spark plug 101a is fired, and output conductors 252–253 each provide an ENG. SYNC* pulse which is the complement of the ENG. SYNC pulse. Transformer coils 256, 257 provide an input signal from trigger pick-up 158, and over voltage protection is provided by a varactor 259.

Primary Interface 360

Primary interface circuit 360 generates a DELAYED DWELL* pulse having a duration proportional to the time contact points 118, 118a are closed.

Referring to FIG. 4, circuit 360 includes an input circuit 362 capable of conditioning signals from a positive or negative grounded battery system. Circuitry 362 comprises operational amplifiers 364, 365, each connected as a comparator circuit, as well as resistors 368–379, a capacitor 381 and diodes 383, 384, connected as shown. A conditioning circuit 390 processes signals from conventional as well as high energy ignition circuits by means of operational amplifiers 392, 393, respectively, each of which is connected as a comparator circuit. The conditioning circuit also includes NAND gates 395–397, resistors 400–418, capacitors 421–424, an inverter 426, input conductors 428, 429, and a one-shot multivibrator 430 connected to a diode 431.

A stretching and delay circuit 434 includes transistors 436–438, an operational amplifier 440 connected as a comparator circuit, an inverter 444, resistors 448, 449, 451, 453–458, and capacitors 461–462, all connected as shown.

Driver transistors 530–531 amplify the signals conducted to output conductors 550–551. The transistors are biased by resistors 537–540.

Primary interface circuit 360 is basically used to condition the signals received from engine 100 in order to provide a DELAYED DWELL* pulse.

Figure 4A:
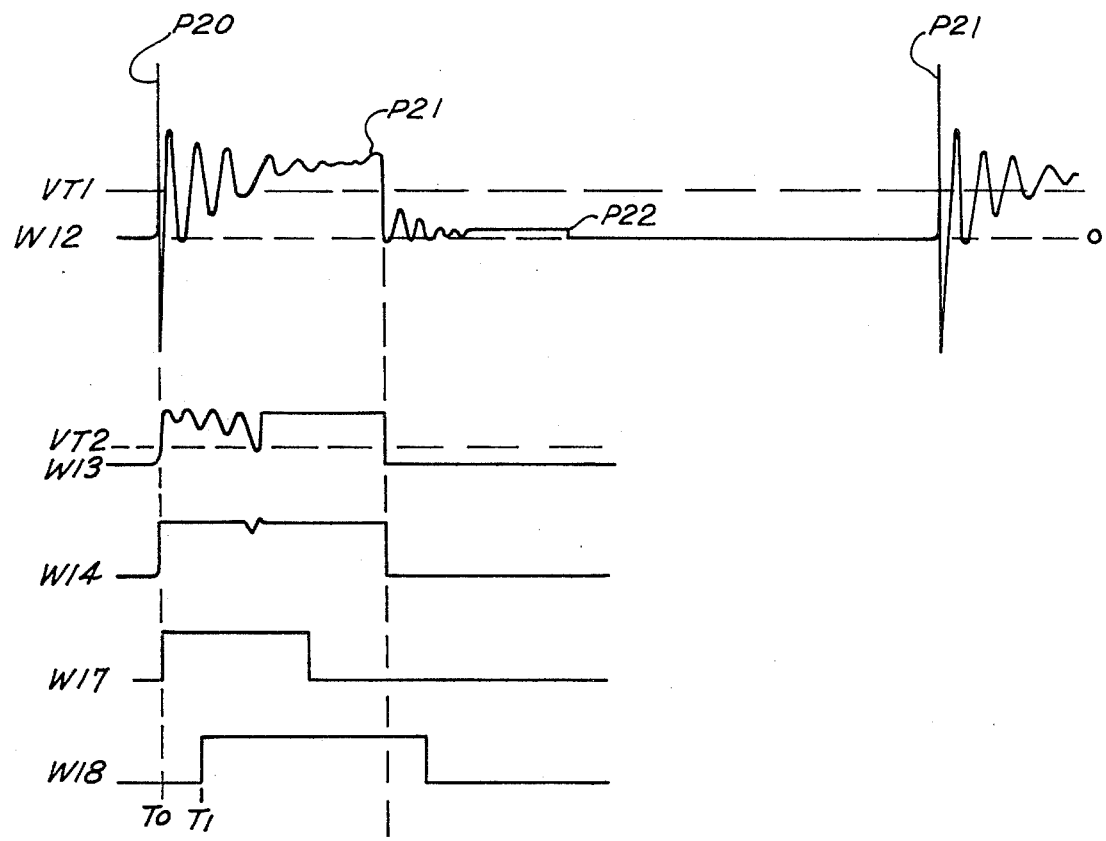
FIG. 4a illustrates exemplary voltage waveforms generated by the interface circuit shown in FIG. 4.

Referring to FIGS. 4 and 4a, the primary interface circuit 360 operates as follows:

Waveform W12 illustrates an exemplary primary voltage waveform of the type received on conductor 155 from primary coil 115. Waveform W12 includes a firing line P20 generated at the time contact points 118, 118a open in order to fire a spark plug. The line between points P20 and P21 on waveform W12 indicates the time period during which current is gapping across the spark plug. At point P22, contact points 118, 118a close in order to initiate the dwell portion of the ignition cycle. The dwell portion ends at point P<when the contact points again open in order to fire another spark plug.

Operational amplifiers 364 and 365 are arranged to accommodate either a negative battery or positive battery ignition system, respectively. The amplifiers from input primary signal W12 remove many of the oscillations by means of a comparator technique. For example, the inverting input of operational amplifier 365 may be biased approximately at voltage VT1 (waveform W12). In response to this operation, the output of operational amplifier 365 produces voltage waveform W13.

Operational amplifiers 392 and 393 apply the same comparator technique as amplifier 364 and 365 in order to convert waveform W13 into a signal more nearly resembling a pulse, such as voltage waveform W14. In order to achieve this result, the inverting input of operational amplifier 392 can be set at approximately VT2 volts (waveform W13). In this mode of operation, operational amplifier 392 produces an output voltage waveform W14 which closely resembles a pulse of the type useful for the data processing apparatus described later.

Operational amplifier 393 is used in connection with so-called high energy ignition (HEI) systems that produce higher voltages than conventional ignition systems. As a result, operational amplifier 393 is less sensitive than operational amplifier 392.

The output of amplifier 393 is connected to the input of one-shot 430 in order to produce an output voltage waveform W17. This voltage is used as a noise blanking signal in order to produce a more nearly uniform pulse at the input of stretching and delay circuit 434.

Monostable multivibrator 430 produces a pulse having a duration of approximately 1 millisecond. It has been found that a multivibrator of this type is needed in connection with certain models of vehicle ignition systems which have a particularly long dwell time period.

NAND gates 395–397 select either the output of amplifier 392 or the output of amplifier 393 for conduction to circuit 434 depending on the state of conductor 429 which is operated from a switch on front panel 182. The switch is set by the operator depending on whether a conventional system or a special high energy ignition system is used in the vehicle being tested.

The output of transistor 436 is amplified by a transistor 437 and is delayed by a filter and delay circuit comprising resistors 457, 458 and capacitors 461, 462. The delay circuit delays the leading and trailing edges of voltage waveform W14 by approximately 600 microseconds in order to produce a voltage waveform W18. This voltage is amplified by operational amplifier 440 and transistor 438. After being conditioned by inverter 444 and additional driver transistors 530, 531, the waveform and its inverse are transmitted over output conductors 550 and 551 as DELAYED DWELL and DELAYED DWELL* pulses, respectively.

Shorting Control Circuit 560

Referring to FIG. 5, shorting control circuit 560 comprises a triac 562 having a gate 563 and current conducting terminals 564, 565. The triac is connected is series with a resistor 567. Gate 563 is driven by a transistor 568, as well as a diode 569, resistors 570–574 and a capacitor 576. Inverters 578, 579 provide the various signals with proper polarity. Triac 562 is switched to its conductive state whenever the signal on conductor 580 is switched to its logical 1 state (i.e., whenever a positive AUTO SHORT* pulse is received). Whenever triac 562 is switched to its conductive state, contacts 118, 118a are shorted to ground (except for the low resistance of resistor 567 and triac 562), and the primary and secondary coils are prevented from firing any spark plugs. Triac 562 also is switched to its conductive state by AND gate 584 when the signal on conductors 581 is switched to its 0 state.

Ammeter Circuit 610

Ammeter Circuit 610 provides output signals proportional to the average amperes and instantaneous amperes flowing through any test wire associated with engine 100, such as the battery cable. The circuit can be automatically ranged and zeroed by the analog system 1100 and data processor.

Figure 6:
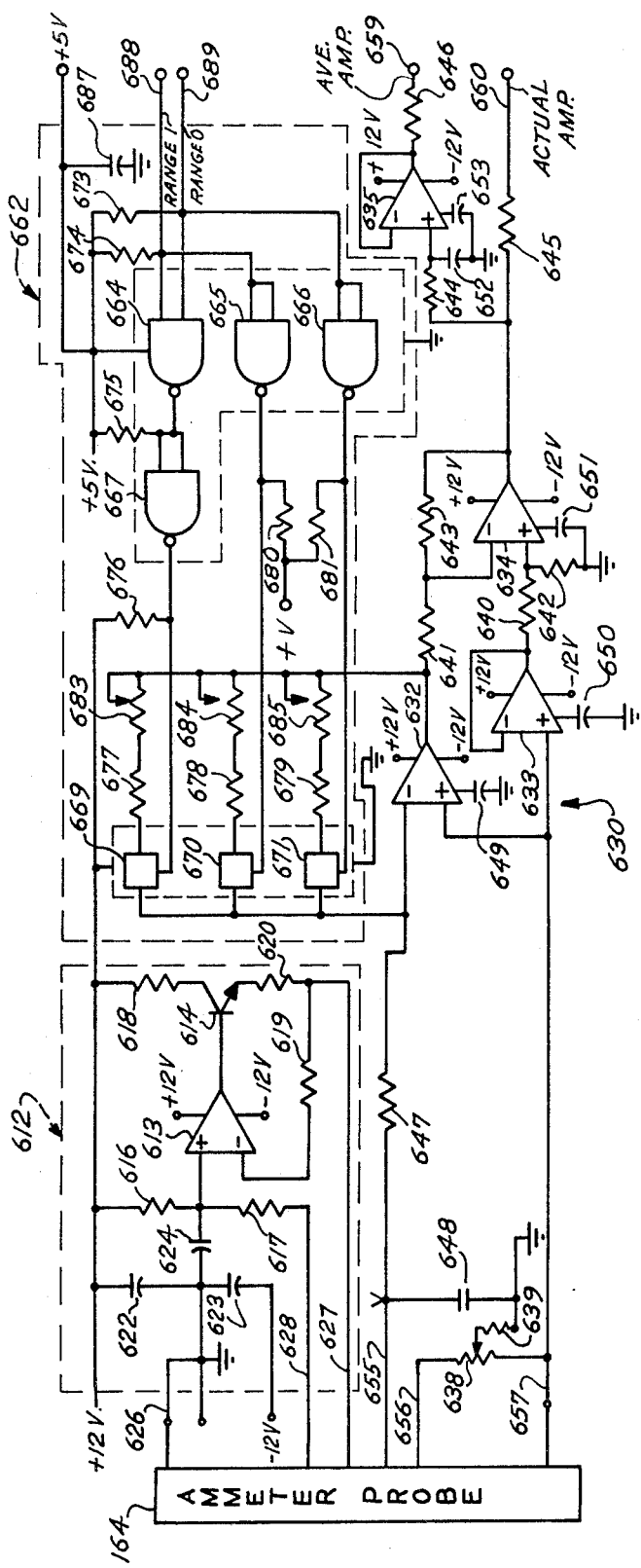
FIG. 6 is a schematic diagram of an ammeter circuit made in accordance with the present invention.

Referring to FIG. 6, ammeter circuit 610 basically comprises a bias circuit 612, a differential amplifier circuit 630 and a range circuit 662.

Bias circuit 612 comprises an operational amplifier 613, a transistor 614, resistors 616–620, and capacitors 622–624, all connected as shown. The components are arranged to provide a constant voltage for ammeter probe 164 through conductor 627. A feedback signal is returned from ammeter proble 164 over conductor 628.

Ammeter probe 164 incorporates a Hall-effect generator which produces a fluctuating dc voltage between conductors 655 and 657 which is proportional to the instantaneous flux density of the field surrounding the wire around which the probe is placed. The flux density, in turn, is proportional to the current flowing through the wire. One such probe is manufactured by Sun Electric Corp., Chicago, Ill., under part number 6005–0133. The voltage difference is measured by differential amplifier circuit 630 by use of operational amplifiers 632–635, resistors 638–647 and capacitors 648–653. Conductor 656, resistor 639 and potentiometer 638 serve as zero adjustment elements to compensate for the offset of the Hall-effect generator.

On output conductor 659, the differential amplifier circuit provides a voltage having an amplitude proportional to the average current flowing through the test wire; an output conductor 660 the differential amplifier circuit provides a voltage having an amplitude proportional to the instantaneous or actual value of the current flowing through the test wire. The circuitry relating to operational amplifiers 632–634 has a relatively rapid time constant so that rapid dc fluctuations in the current flowing through the test wire result in corresponding fluctuations of the voltage on output conductor 660. The circuitry associated with operational amplifier 635 includes additional filtering and a longer time constant so that the voltage appearing on output conductor 669 is proportional to the average current fluctuation in the test wire.

The sensitivity of differential amplifier circuit 630 is controlled by range circuit 662 which includes NAND gates 664–667, switching gates 669–671, resistors 673–681, potentiometers 683–685 and a capacitor 687. The value of the resistance in the feedback circuit of operational amplifier 632 is controlled by the conductive state of gate switches 669–671. These gate switches, in turn, are controlled by the logical state of the range adjustment signals appearing on range 1 control conductor 688 and range 0 control conductor 689.

Voltmeter Circuit 700

Referring to FIG. 7, voltmeter circuit 700 produces on an output conductor 748 a voltage signal having an amplitude proportional to the voltage across test leads 162, 163. The circuit can be automatically ranged by analog system 1100 and the data processor.

Circuit 700 comprises a differential input amplifier 702, an operational amplifier 704 connected as an active low-pass Butterworth filter, and an operational amplifier 706 connected as an inverting amplifier. The circuit also includes diodes 710–714, capacitors 718–724, resistors 730–743, potentiometers 745–746, and a field-effect transistor 747 which controls the range and sensitivity of circuit 700.

Amplifier 702 has an input impedance greater than ten megohms, and both the positive and negative input to the amplifier are clamped to +15 and −15 volts. The gain of the amplifier is controlled by potentiometer 745 and is approximately 0.1.

Amplifier 704 is a non-inverting amplifier having an output signal in phase with the input signal across leads 162, 163. The amplifier rolls off at about −12 decibels per octave at frequencies above about 100 Hz. The upper limit of the roll off frequency is chosen at the maximum AC frequency of an internal combustion engine under starting conditions.

Amplifier 706 has a programmable gain range controlled by the conductive or non-conductive state of field effect transistor 747. Transistor 747, in turn, is controlled by the logic signal transmitted over conductor 749.

Data Processor 1090

Overall system processing and management is controlled by data processor 1090. The processor performs a number of tasks which may be summarized as follows:

1. Data is received from analog control 1100 and counting cylinder control 1400 which measure the voltage or current of the starter power signal shown in FIG. 2; and 2. Data received from analog control and counting and cylinder control is manipulated to provide output commands to character controller 1800 which enable the display of alphabetic and numeric information relating to engine compression on display monitor 190.

Figure 2B:
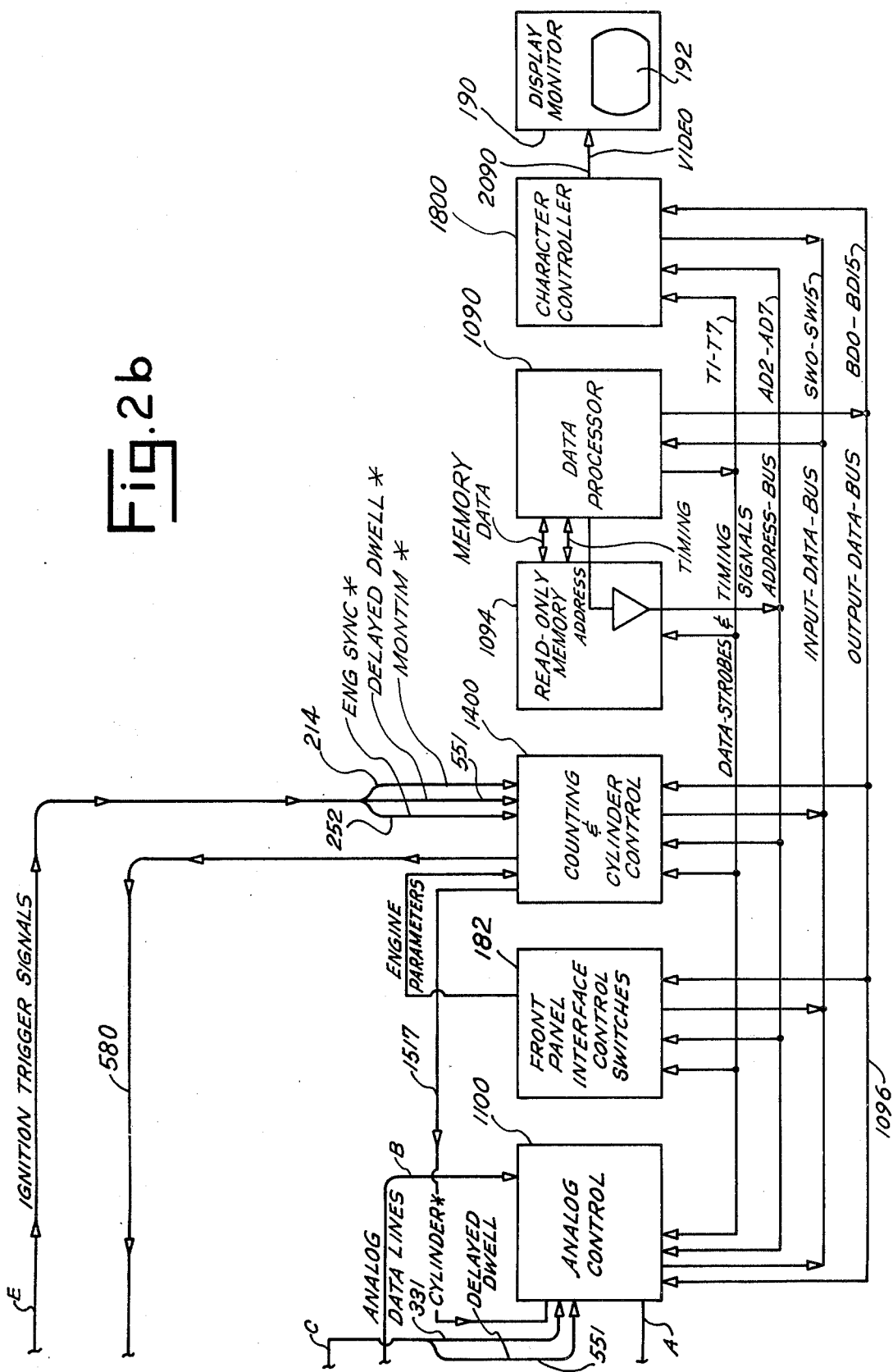

As shown in FIG. 2b, data processor 1090 treats analog control 1100, counting and cylinder control 1400 and character controller 1800 as peripheral devices which are interconnected by means of a processing bus 1096. The bus includes output data bus conductors BD0-BD15, input data bus conductors SW0-SW15, address conductors AD2-AD8 and timing signal conductors T1-T7. The signal mnemonics for the pulses transmitted on conductors T1-T4 are shown in Table B.

TABLE B

| Timing Signal Conductor | Signal Mnemonic |
| --- | --- |
| T1 | RESET* |
| T2 | READ STROBE |
| T3 | WRITE STROBE |
| T4 | CLK* |
| T5 | FLAG 8 |
| T6 | FLAG 14 |
| T7 | INTRA |

Figure 2C:
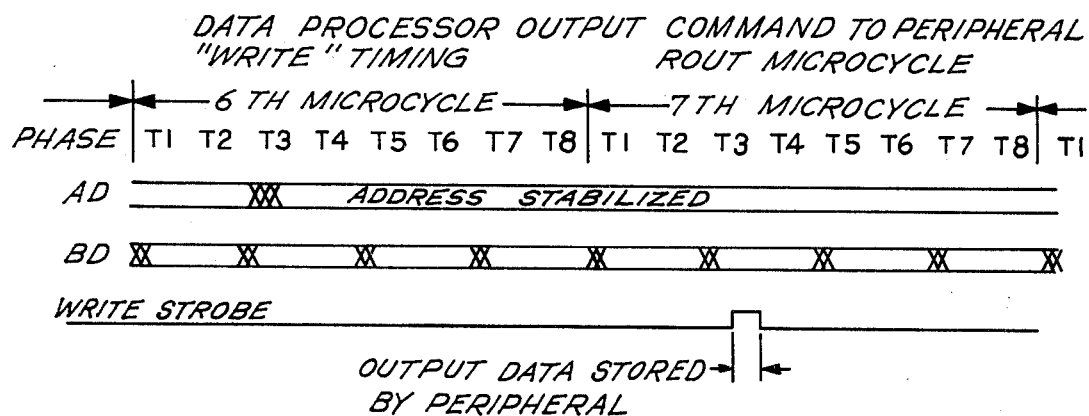
FIGS. 2c and 2d are timing diagrams showing the manner in which data is transmitted and received by the data processor of the preferred embodiment.

The manner in which the data processor outputs commands to peripheral devices, such as analog controller 1100 or counting and cylinder control 1400, is shown in FIG. 2c. The data processor operates through a number of microcycles, the 6th and 7th of which are illustrated in FIG. 2c. The bits of data transmitted in the output commands are communicated to the peripheral device over output data bus conductors BD0-BD15. In order to have the data on the BD conductors received by the proper peripheral devices, the proper address of the peripheral device must be placed on the address (AD) conductors during phase T3 of the 6th microcycle (FIG. 2c). During the remaining portion of the 6th microcycle and throughout the 7th microcycle, the address identifying bits on the AD conductors are stabilized. Throughout the 6th microcycle and part of the 7th microcycle, information used internally by the data processor continues to be placed on the output BD conductors. This mode of operation is signified by the x's shown in FIG. 2c during phases T3, T5 and T7 of the 6th microcycle and phase T1 of the 7th microcycle. Just prior to phase T3 of the 7th microcycle, the data processor places on the BD ouput conductors the bits of information intended to be received by the peripheral device addressed by the AD conductors. As soon as the data has stabilized on the BD conductors, between phases T3 and T4 of the 7th microcycle, the data processor generates a WRITE STROBE pulse. During the duration of the WRITE STROBE, the output data on the BD conductors is stored by the peripheral device for later use. After the WRITE STROBE is returned to its 0 state, a different peripheral device can be addressed and different data can be transmitted to the BD output conductors.

Figure 2D:
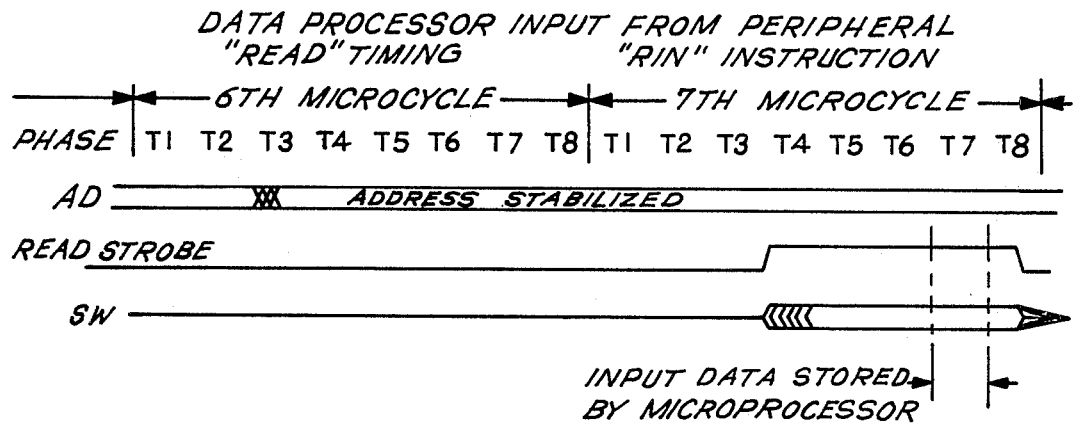

The manner in which the data processor inputs data from a peripheral is shown in connection with FIG. 2d. As in the case of the output commands, the address of the peripheral device from which information is needed is placed on address conductors AD during phase T3 of the 6th microcycle. Throughout the remaining portion of the 6th microcycle and the 7th microcycle, this address remains stabilized on the AD conductors. During phase T3 of the 7th microcycle, the data processor transmits a READ STROBE on conductor T2 which enables the peripheral device addressed on conductors AD to transmit bits of data over the input data bus conductors SW. During phase T4 of the 7th microcycle, the input data is stabilized and remains stable until the phase T8 of the 7th microcycle. At the end of the 7th microcycle, the data processor returns the READ STROBE to its 0 state, and then can address a different peripheral device to receive additional information.

One suitable data processor is the IMP-16C manufactured by National Semiconductor Corporation, Santa Clara, Calif. The IMP-16C is a 16 bit parallel processor having an arithmetic unit and a control unit. The processor includes a read/write memory for temporarily storing values. For example, the values of various modified engine conditions or parameters are temporarily stored before they are transmitted to character controller 1800.

As shown in FIG. 2b, data processor 1090 is used in connection with a read only memory 1094 having a storage capacity of about 5k. The IMP-16C processor can be used with a variety of read only memories as long as they have an access time equal to or less than 850 nanoseconds. Instructions for wiring read only memory 1094 and connecting it to the processing bus and data processor may be found in the IMP-16C Application Manual published by National Semiconductor Corporation in January, 1974. (Publication No. 420021C).

Analog System 1100

Analog system 1100 sets up and controls the data acquisition circuits previously described so that the various analog parameters of the electrical power signal supplied to starter 126 are systematically channeled to a single analog-to-digital converter which makes the value of the parameter available to the data processor in the form of a discrete, digital amplitude measurement signal.

Referring to FIGS. 8a-8f, analog system 1100 basically comprises a range control circuit 1102, a set-up and selection circuit 1160, a sampling control circuit 1246, a real-time clock 1320, a multiplexer 1350, and an analog-to-digital converter 1352.

Referring to FIG. 8a, range control circuit 1102 receives input data from data output bus conductors BD4-BD11 and uses this information to determine the range of the engine parameter circuitry to be selected for a particular measurement. Information received on the data output bus conductors is stored in quad latches 1104–1111 during the WRITE STROBE signal as described in FIG. 2c. The proper analong circuitry range is also selected by NAND gates 1114–1126, AND gates 1128–1135, inverters 1138–1140, and a binary decoder 1142. Decoder 1142 is connected to the range control conductors of the data acquisition circuits previously described. Range adjustment signals are transmitted over these conductors. Output conductors 1145–1152 interconnect the components in the manner shown.

Figure 8B:
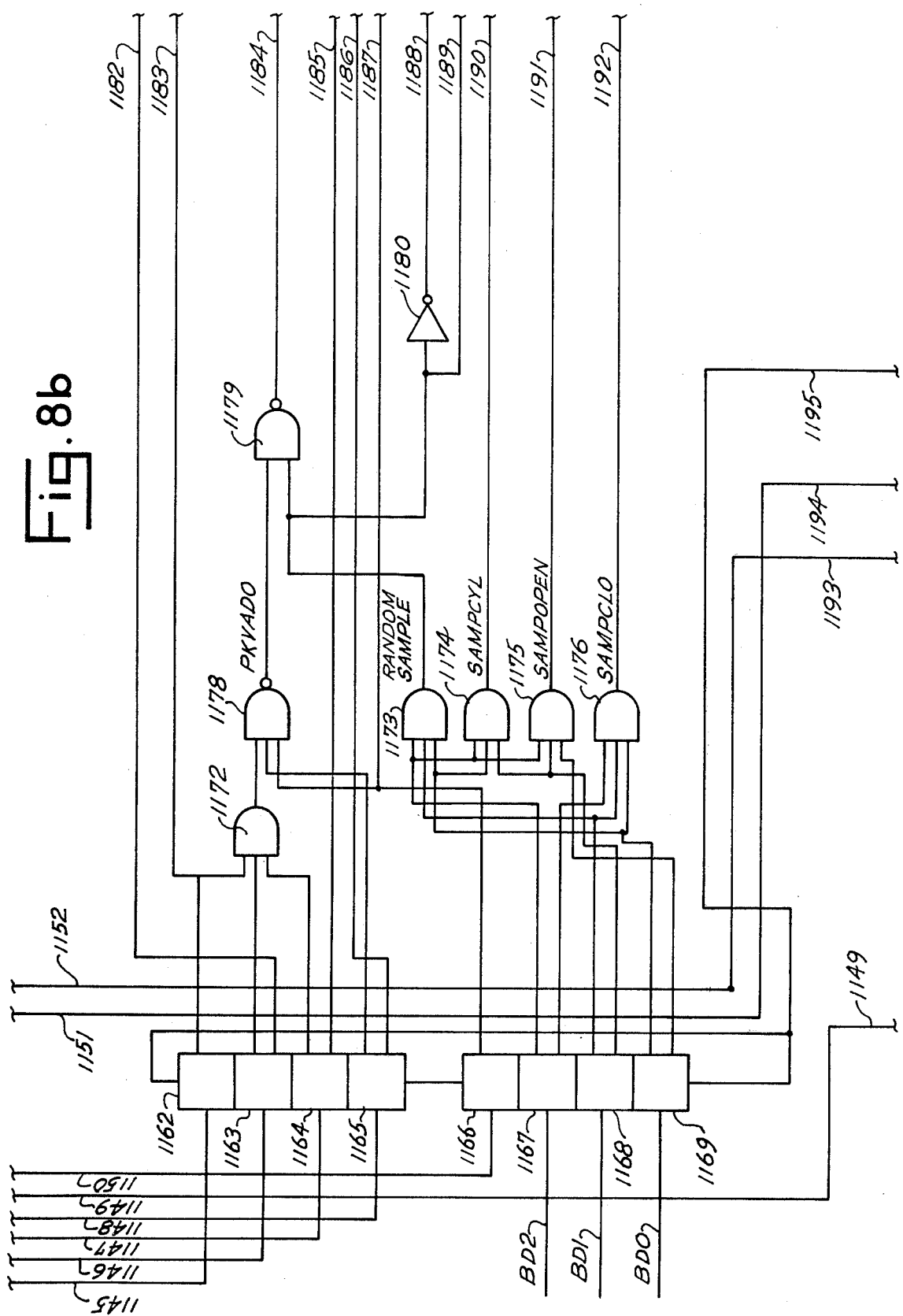
Figure 8C:
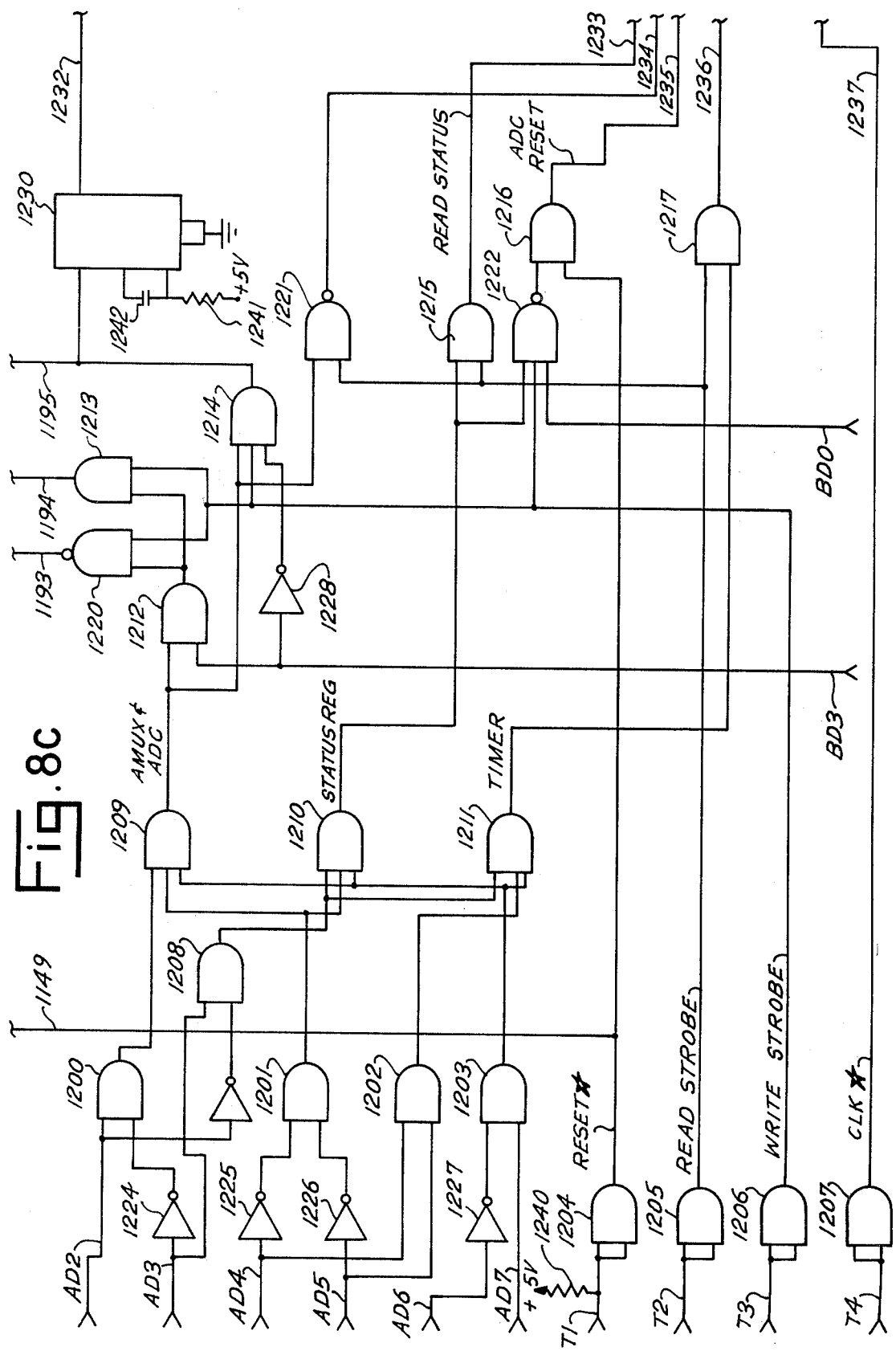

Referring to FIG. 8b, set-up and selection circuit 1160 comprises quad latches 1162–1169, data output bus conductors BD0-BD2, AND gates 1172–1176, NAND gates 1178–1179, an inverter 1180, and output conductors 1182–1195, all connected as shown. Referring to FIG. 8c, circuit 1160 also includes address bus conductors AD2-AD7, timing conductors T1-T4, data outputs bus conductors BD0-BD3, AND gates 1200-1217, NAND gates 1220-1222, inverters 1224-1228, a one shot multivibrator 1230, output conductors 1232-1237, resistors 1240-1241, and a capacitor 1242, all connected as shown.

Figure 8D:
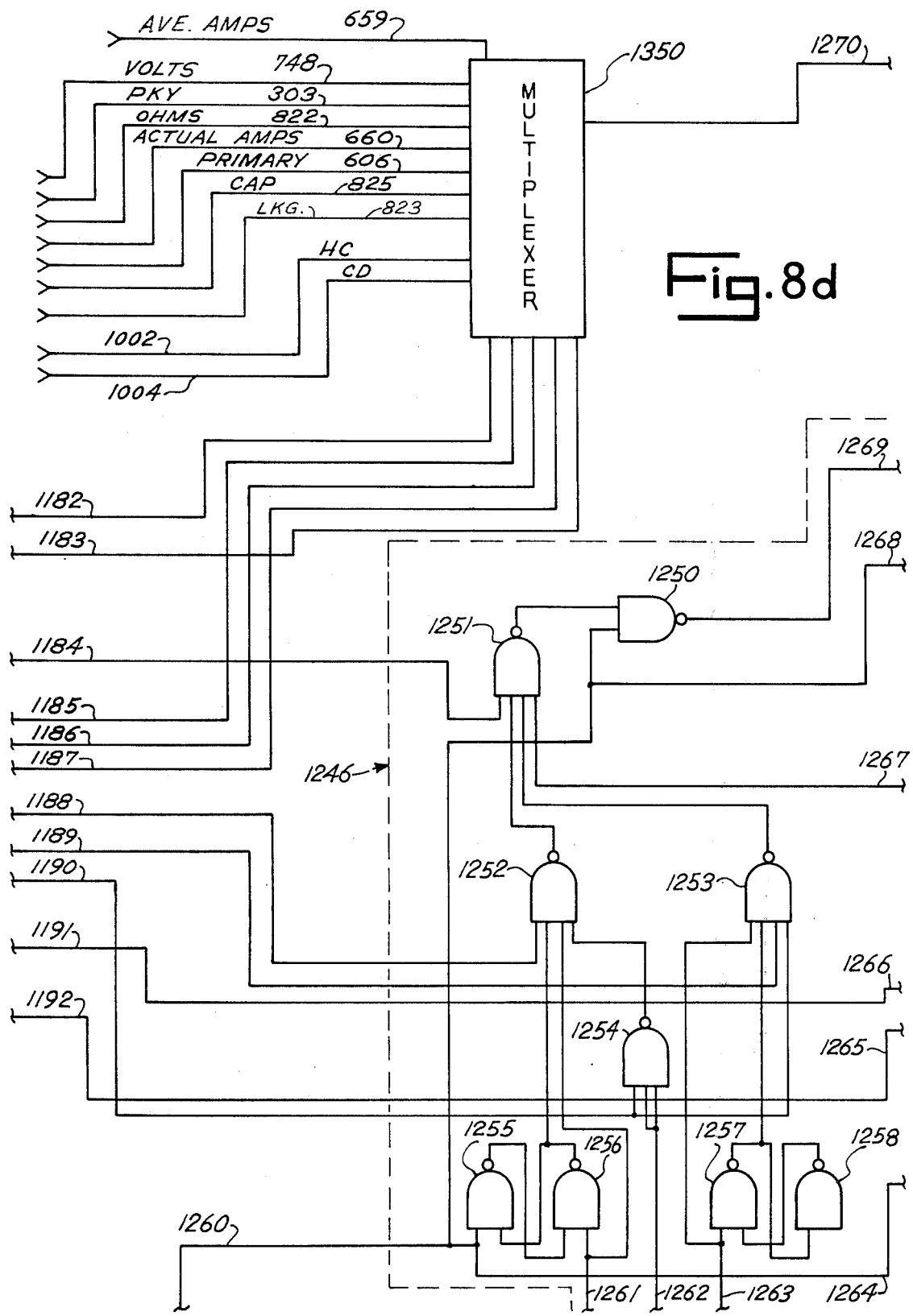
Figure 8E:
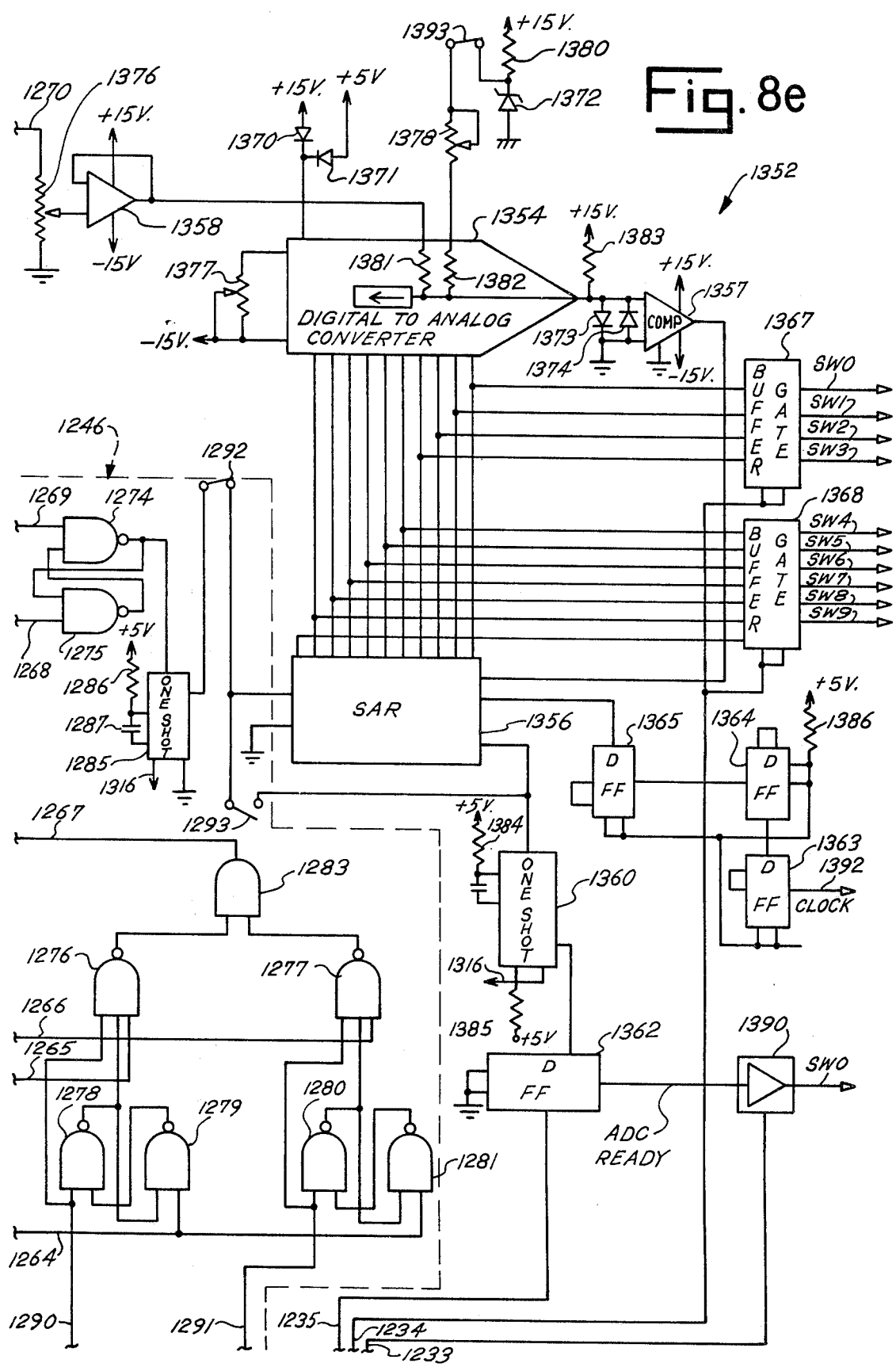
Figure 8F:
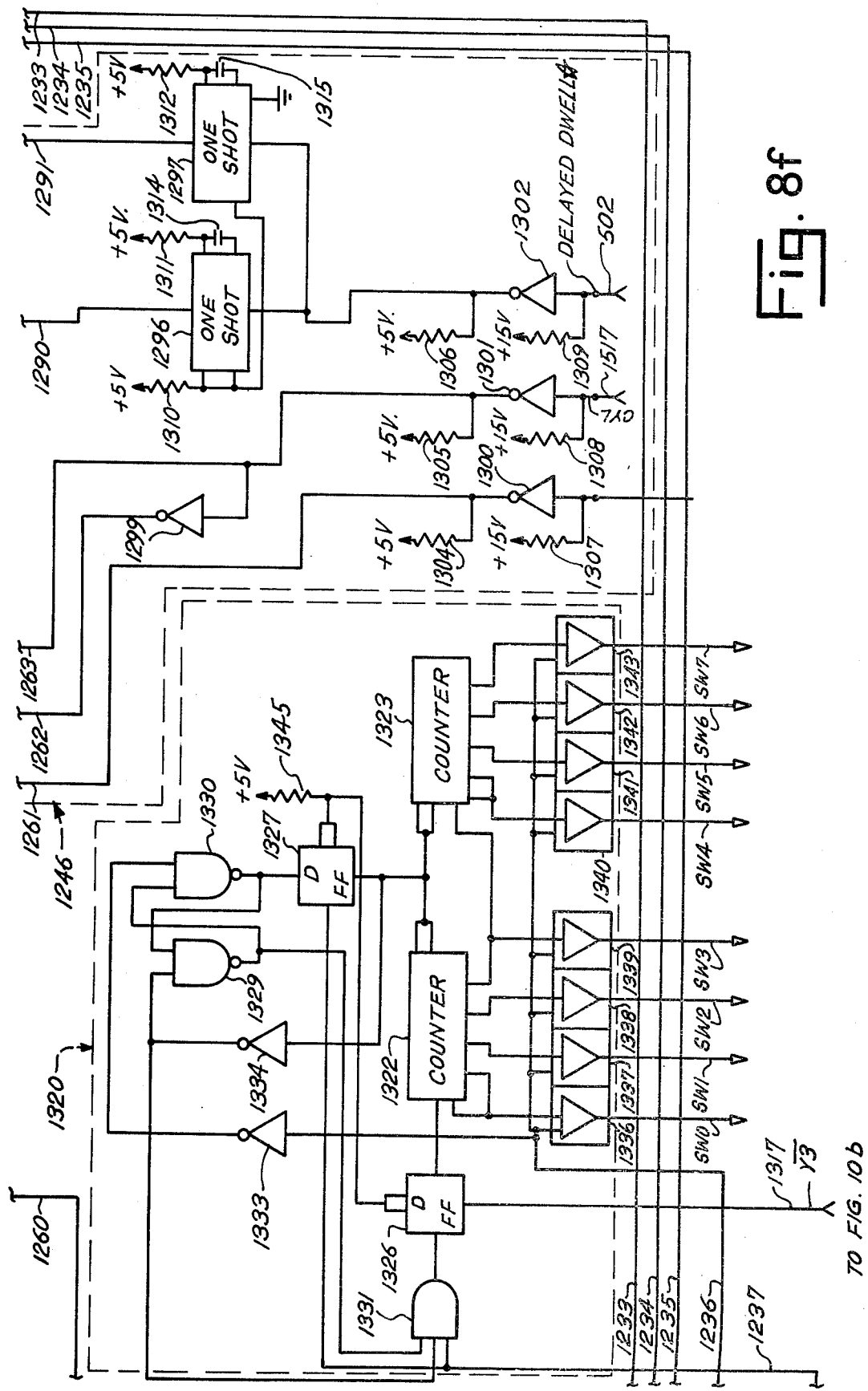

Referring to FIG. 8d, sampling control circuit 1246 comprises NAND gates 1250-1258 and output conductors 1260-1270. Referring to FIG. 8e, circuit 1246 also includes NAND gates 1274-1281, and AND gate 1283, a one shot multivibrator 1285, a resistor 1286, a capacitor 1287, output conductors 1290-1291, a run switch 1292 shown in the run position and a calibrate switch 1293 shown in the run position. Referring to FIG. 8f, sampling control circuit 1246 also includes one shot multivibrators 1296, 1297, inverters 1299-1302, resistors 1304-1312, capacitors 1314-1315, and output conductors 1316, 1317. As shown in FIGS. 8d-8f, the sampling control circuit receives inputs from conductors 330, 1517 and 502 which determine the point of time at which converter circuit 1352 begins to convert the data received by multiplexer 1350.

Referring to FIG. 8f, real-time clock 1320 comprises counters 1322, 1323, D-type flipflops 1326, 1327, NAND gates 1329, 1330, an AND gate 1331, inverters 1333, 1334, tristate buffers 1336-1343, a resistor 1345 and input data bus conductors SW0-SW7. The real-time clock indicates to the data processor how long an operation has been running. This is particularly useful when the analog measuring circuits are being set-up and selected. In addition, it provides a means of determining the relative times at which the amplitude measurement signals were generated.

Referring to FIG. 8e, analog-to-digital converter 1352 comprises a digital-to-analog converter 1354, a successive approximation register (SAR) 1356, a comparator 1357, an amplifier 1358, one-shot multivibrator 1360, D-type flipflops 1362-1365, tristate buffer gates 1367-1368, diodes 1370-1374, potentiometers 1376-1378, resistors 1380-1386, a tristate buffer 1390 and an input conductor 1392 for receiving a clock pulse. A switch 1393 is shown in the closed or run position used during normal operation of the system. During calibration, switch 1393 is moved to its open position.

Operation of Analog System 1100

Ammeter circuit 610 and voltmeter circuit 700 each are capable of operating in a plurality of ranges depending on the magnitude of the parameter being meausred. Each of these circuits requires the selection of the proper range. Once a range is selected, a time delay is required for the circuitry to settle or establish stable conditions before the analog-to-digital conversation is performed. In order to achieve this mode of operation, the data processor goes through a similar procedure for each of the circuits. The numerical values read in the various ranges is shown in Table C:

TABLE C

| PARAMETER | NUMERICAL RANGE IN DISPLAYED ENGINEERING UNITS | RANGE CODE | RANGE LIMIT NUMBERS READING ACCEPTABLE IF READING VALUE INDICATED, OTHERWISE SWITCH TO NEXT LOWEST RANGE | CONVERSION FACTOR |
|---|---|---|---|---|
| (1) VOLTS | 0-25.00 | 0 | ok | .0476 |
|  | 25.0-100.0 | 1 | $.2 \times 2^9$ | .1905 |
| (3) AMPS | 0-62.5 | 0 | ok | .1190 |
|  | 62.5-250 | 1 | $.2 \times 2^9$ | .4762 |
|  | 250-1000 | 2 | $.2 \times 2^9$ | 1.905 |

If the programming of the data processor calls for any analog value to be read from engine 100, it issues an ACD FLAG RESET OUTPUT COMMAND of the type shown in Table 1.

TABLE 1

| ADC FLAG RESET OUTPUT COMMAND | | | | | | | | | |
|---|---|---|---|---|---|---|---|---|---|
| T1 | T2 | T3 | T4 | AD2 | AD3 | AD4 | AD5 | AD6 | AD7 |
| 1 | 0 | 1 | 0 | 0 | 1 | 0 | 0 | 0 | 1 |

As shown in Table 1, the OUTPUT COMMAND is performed by placing binary bits 1010 on timing conductors T1-T4, respectively, and by placing binary bits 010001 on address conductors AD2-AD7, respectively. Of course, as explained in connection with FIG. 2c, each OUTPUT COMMAND, including the one shown in Table 1, requires a WRITE STROBE on conductor T3. In response to the coding shown in Table 1, the output of AND gate 1215 (FIG. 8c) is switched to its 1 state so that the output of D-type flipflop 1362 (FIG. 8e) is switched to its 0 state, thereby lowering the ADC READY flag.

After the ADC READY flag has been reset to 0, the data processor can issue an ADC SETUP OUTPUT COMMAND by placing the data bits shown in Table 2 on the address conductors AD2-AD7 and the data output conductors BD3-BD11.

TABLE 2

| ADC SET UP OUTPUT COMMANDS | | | | | | | | | | | | | | |
|---|---|---|---|---|---|---|---|---|---|---|---|---|---|---|
| AD2 | AD3 | AD4 | AD5 | AD6 | AD7 | BD3 | BD4 | BD5 | BD6 | BD7 | BD8 | BD9 | BD10 | BD11 |
| 1 | 0 | 0 | 0 | 0 | 1 | 1 | Range | | | | Analog Channel | | | |

As shown in Table 2, the analog channel (i.e., the parameter to be measured) is coded on conductors BD7-BD11 and is stored in latches 1107-1116, respectively (FIG. 8a). This information is used by multiplexer 1350 to select the proper parameter. The proper range of the parameter selector for measurement is coded on conductors BD4-BD6 and is stored in latches 1104-1106, respectively during the WRITE STROBE.

After issuing the SETUP OUTPUT COMAND, the data processor determines the proper period of time delay by inputing the count of real time clock 1320 through a REAL TIME CLOCK INPUT COMMAND shown in Table 3.

TABLE 3

REAL TIME CLOCK INPUT COMMAND

| AD2 | AD3 | AD4 | AD5 | AD6 | AD7 | SW0 SW1 SW2 SW3 SW4 SW5 SW6 SW7 |
|---|---|---|---|---|---|---|
| 0 | 1 | 1 | 1 | 0 | 1 | ← Time → |

The input command addresses the real time clock by putting the bit code shown in Table 3 on address conductors AD2-AD7. As soon as a READ STROBE is produced, the count of the real time clock is available over input conductors SW0-SW7. As explained previously, the real time clock registers the count of the increments of a free running clock having a period of about 1.008 milliseconds. The clock is capable of registering count or time signals having values from 0 to 225 and then resetting to 0 and beginning the count again. A REAL TIME CLOCK IUPUT COMMAND resets the clock to 0. By subsequently issuing another REAL TIME CLOCK INPUT COMMAND, the data processor can determine the amount of elapsed time, and thereby knows whether the analog circuit has had sufficient time to set up.

After an appropriate amount of time has elapsed, based on data from the real time clock, the data processor initiates the analog-to-digital conversion by issuing an ADC CONVERSION OUTPUT COMMAND as shown in Table 4.

TABLE 4

ADC CONVERSION OUTPUT COMMANDS

| AD2 | AD3 | AD4 | AD5 | AD6 | AD7 | BD0 BD1 BD2 | BD3 BD4 BD5 BD6 | BD7 BD8 BD9 BD10 BD11 |
|---|---|---|---|---|---|---|---|---|
| 1 | 0 | 0 | 0 | 0 | 1 | ← Sampling Time → | 0 — — — | ← Multiplex Channel → |

As soon as a WRITE STROBE is received by analog system 1100, the multiplex channel for the required conversion is designated by the bits on conductors BD7-BD11 and the sampling time is designated by the bits on conductors BD0-BD2. Bits BD0-BD2 enable the conversion to take place in synchronism with the DELAYED DWELL: signal on conductor 502 or the CYL signal on conductor 1517. (FIG. 8f). As soon as the conversion is completed, the analog circuitry automatically raises the ADC READY flag by switching the output of D flip-flop 1362 to its 1 state.

The data processor determines whether the ADC conversion is completed by inputting the ADC READY flag through an INPUT STATUS REGISTER INPUT COMMAND of the type shown in Tabel 5.

TABLE 5

INPUT STATUS REGISTER INPUT COMMAND

| AD2 | AD3 | AD4 | AD5 | AD6 | AD7 | SW0 |
|---|---|---|---|---|---|---|
| 0 | 1 | 0 | 0 | 0 | 1 | Status of ADC |

The status register consists of a number of storage latches, such as 1390 (FIG. 8e) which are scattered throughout the circuitry. By placing the address of the status register on conductors AD2-AD7, (shown in Table 5), the ADC READY flag can be read from the state of conductor SW0, and the status of many other functions in the circuitry can be read from various SW conductors which will be described hereafter. If the data processor finds that the ADC READY flag is in its 1 state, it knows that the analog-to-digital conversion is complete. At this point in time, data processor can receive the digital measurement signal stored in buffer gates 1367, 1368, corresponding to the desired analog parameter, by issuing a READ ADC INPUT COMMAND shown in Table 6.

TABLE 6

READ ADC INPUT COMMAND

| AD2 | AD3 | AD4 | AD5 | AD6 | AD7 | SW0 - SW9 |
|---|---|---|---|---|---|---|
| 1 | 0 | 0 | 0 | 0 | 1 | ADC Data |

As shown in Table 6, as soon as a READ STROBE is generated by the data processor, the ADC digital amplitude measurement signal is available for storage by the data processor over condutors SW0-SW9.

Counting and Cylinder Control System 1400

Figure 9B:
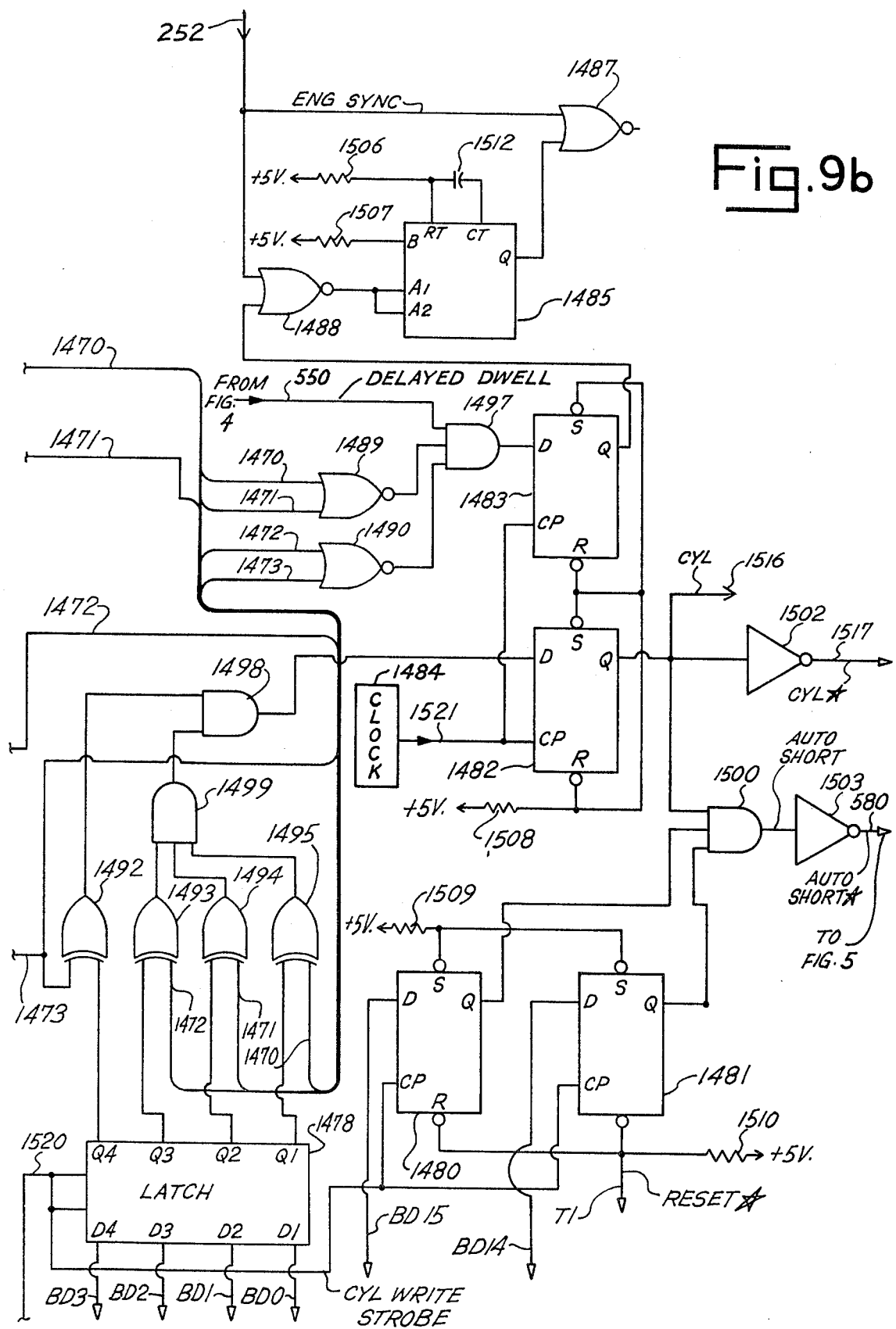

Referrring to FIGS. 9a-9c, counting and cylinder control system 1400 comprises a cylinder selection circuit 1402, a counter circuit 1412, and a decoder circuit 1417, together with additional components.

Referring to FIG. 19a, cylinder selection circuit 1402 comprises input inverters 1404-1409. The inverters receive inputs from conductors 1438-1442 that are connected to resistors 1438a-1442a and capacitors 1438b-1432b, respectively. The data processor automatically determines the number of cylinders in engine 100 and transmits MOD3*, MOD4*, MOD6*, MOD8* and MOD12* signals to input conductors 1438-1442 depending on whether the engine being tested has 3, 4, 6, 8 or 12 cylinders, respectively.

Counter circuit 1412 includes flipflop-type counters 1414-1416 which continuously count through states 0-7 without being reset, except when the circuit is initially connected to an operating engine. After the first pulse transmitted over conductor 252 is received and inverted by inverter 1444I, the counter circuit is not reset, but continually counts through states 0-7 at a rate determined by the pulses received on conductor 551.

Decoder circuit 1417 comprises AND gates 1418-1426, NOR gates 1428-1431, NAND gates 1433-1436 and an inverter 1437. The cylinder selection circuit, counter circuit and decoder circuit are interconnected by conductors 1448-1461 through cables 1463, 1464. Output conductors 1470-1473 represent digital bit positions 0-3, respectively for purposes of determining the spark plug of the engine which is about to be fired.

Referring to FIG. 9b, control system 1400 comprises a latch 1478 which receives binary information from data bus conductors BD0–BD3. The circuitry also includes D-type flipflops 1480–1483, a one-shot multivibrator 1485, NOR gates 1487–1490, Exclusive OR gates 1492–1495, AND gates 1497–1500, inverters 1502–1503, resistors 1506–1510, a capacitor 1512, and output conductors 1514, 1516, 1517, 1520 and 1521.

Exclusive OR gates 1492–1495 operate as comparators. When the binary number stored in latch 1478 is identical to the binary number represented on output conductors 1470–1473, the Exclusive OR gates cause AND gate 1498 to produce an output pulse. During the next clock pulse received over conductor 1521 from a clock pulse generator 1484, the Q output of flipflop 1482 is switched to its one state and remains in its one state until the binary number represented by conductors 1470–1473 is changed. Referring to FIG. 9c, counter and cylinder control system 1400 also comprises AND gates 1524–1527 and a NOR gate 1529 which are used to operate the remaining circuitry when an appropriate address in the form of binary data is received on address conductors AD2–AD7.

The system also includes logic gates 1530–1535, switches 1540–1545 and resistors 1550–1555. The circuitry can be used in order to manually introduce data into the data processor by means of manipulating the switches. Output conductors 1557–1558 connect the circuitry in the manner shown. AND gates 1560, 1561 provide read and write strobes from strobe bus conductors T2 and T3.

In order to designate a particular cylinder of engine 100 for shorting or sampling of engine parameters, the data processor issues a CYLINDER SELECT OUTPUT COMMAND shown in Table 7:

TABLE 7

| Ad2 | AD3 | AD4 | AD5 | AD6 | AD7 | BD15 | BD0 - 3 |
|---|---|---|---|---|---|---|---|
| 1 | 0 | 1 | 1 | 0 | 1 | Short = 1 Sample = 0 | No. of Cylinder |

If conductor BD15 is switched to its 1 state, the Q output of flipflop 1480 (FIG. 9b) is switched to its 1 state so that inverter 1503 is enabled to produce an AUTO SHORT* pulse. If conductor BD15 is switched to its 0 state, AND gate 1500 is disabled so that no AUTO SHORT* pulse can be produced. During the WRITE STROBE, the number of the selected cylinder is stored in latch 1478 from conductors BD0–BD3.

In order to determine whether a CYL pulse for a selected cylinder is being generated, the data processor issues a CYLINDER READ INPUT COMMAND shown in Table 7A:

TABLE 7A

| AD2 | AD3 | AD4 | AD5 | AD6 | AD7 | SW1 |
|---|---|---|---|---|---|---|
| 1 | 0 | 1 | 1 | 0 | 1 | Status of CYL pulse |

If the CYL pulse is being generated, conductor SW1 is switched to its 1 state and can be read into the data processor in response to a READ STROBE.

Operation of Counting And Cylinder Control System 1400

The circuitry shown in FIGS. 9a–9c operates as follows:

Clock pulse generator 1484 (FIG. 9b) produces a pulse approximately every 22.4 microseconds. These pulses are used to clock data into flipflops 1482, 1483.

Figure 9D:
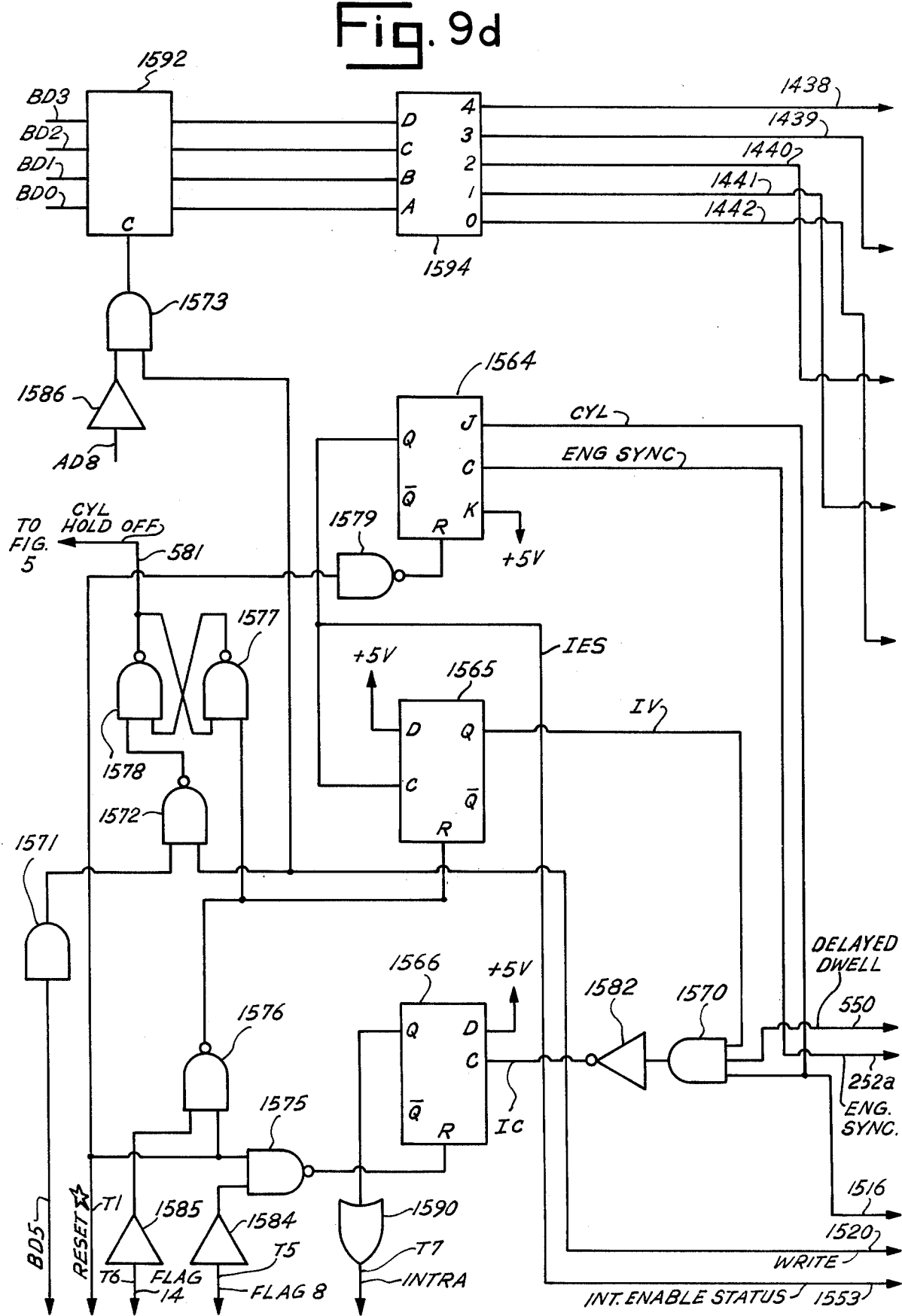
Figure 9E:
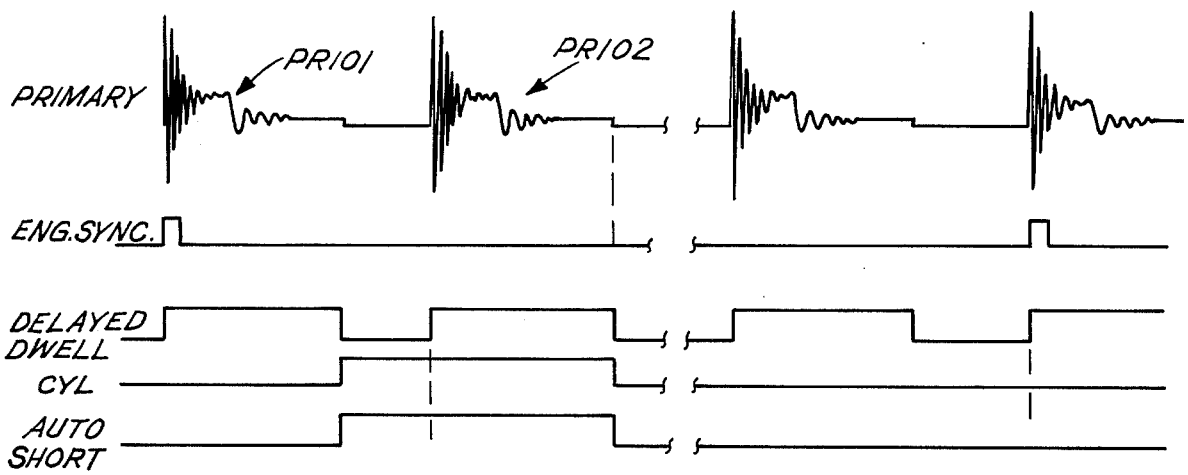
FIG. 9e illustrates exemplary voltage waveforms produced by the circuit shown in FIGS. 9a–9c.

FIG. 9e illustrates exemplary primary ignition waveforms PR101, PR102 and PR108 which correspond with the primary ignition signals produced in order to fire spark plugs 101a, 102a and 108a, respectively. Additional ignition waveforms, of course, are produced by primary coil 115 in order to fire spark plugs 103a–107a. Also shown in FIG. 9e are the ENG SYNC pulses produced by the circiutry shown in FIG. 3, and the DELAYED DWELL signal produced by the circuitry in FIG. 4. The DELAYED DWELL signals advance counters 141–1416 (FIG. 9a).

when the system is turned on, the first ENG SYNC pulse resets counters 1414–1416, and thereafter, the counters continue to operate in response to the DEALYED DWELL pulses without being reset. Due to the delays inherent in the filtering circuits in FIGS. 3 and 4, the ENG SYNC and DELAYED DWELL signals actually may delayed a few hundred microseconds from their time relationship with the primary ingnition sigals shown in FIG. 9e.

In order to obtain information about the ignition signals for a particular cylinder of engine 100, the ciruitry shown in FIGS. 9a–9c is capable of producing a CYL signal of the type shown in FIG. 9e. In the example shown in FIG. 9e, the CYL signal is used to obtain information for cylinder 102 or spark plug 102a. In order to produce the CYL signal shown in FIG. 9e, the data processor issues a CYLINDER SELECT OUTPUT COMMAND in the manner previously described.

Referring to FIG. 9d, control system 1400 also includes a hardware interrupt circuit 1562 comprising flipflop circuits 1564–1566 AND gates 1570–1573, NAND gates 1575–1579, an inverter 1582, drivers 1584–1586, an OR gate 1590, and latch 1592 and a decoder 1594.

The hardware interrupt circuit is used in cooperation with the data processor in order to count the number of cylinders in the engine and thereafter short the ignition system so that the relative compression can be calculated in a manner described later.

CHARACTER CONTROLLER 1800

Character controller 1800 is a character generator used to generate the video signals required to display alphabetic, numeric and symbolic characters on the face of the CRT tube located in display monitor 190. The character controller has a refresh capability which continues refreshing the data on the CRT screen once a set of characters has been inputted to the device by the data processor. This same set of characters will be refreshed until a new command is received from the data processor.

Figures 10, 10E:
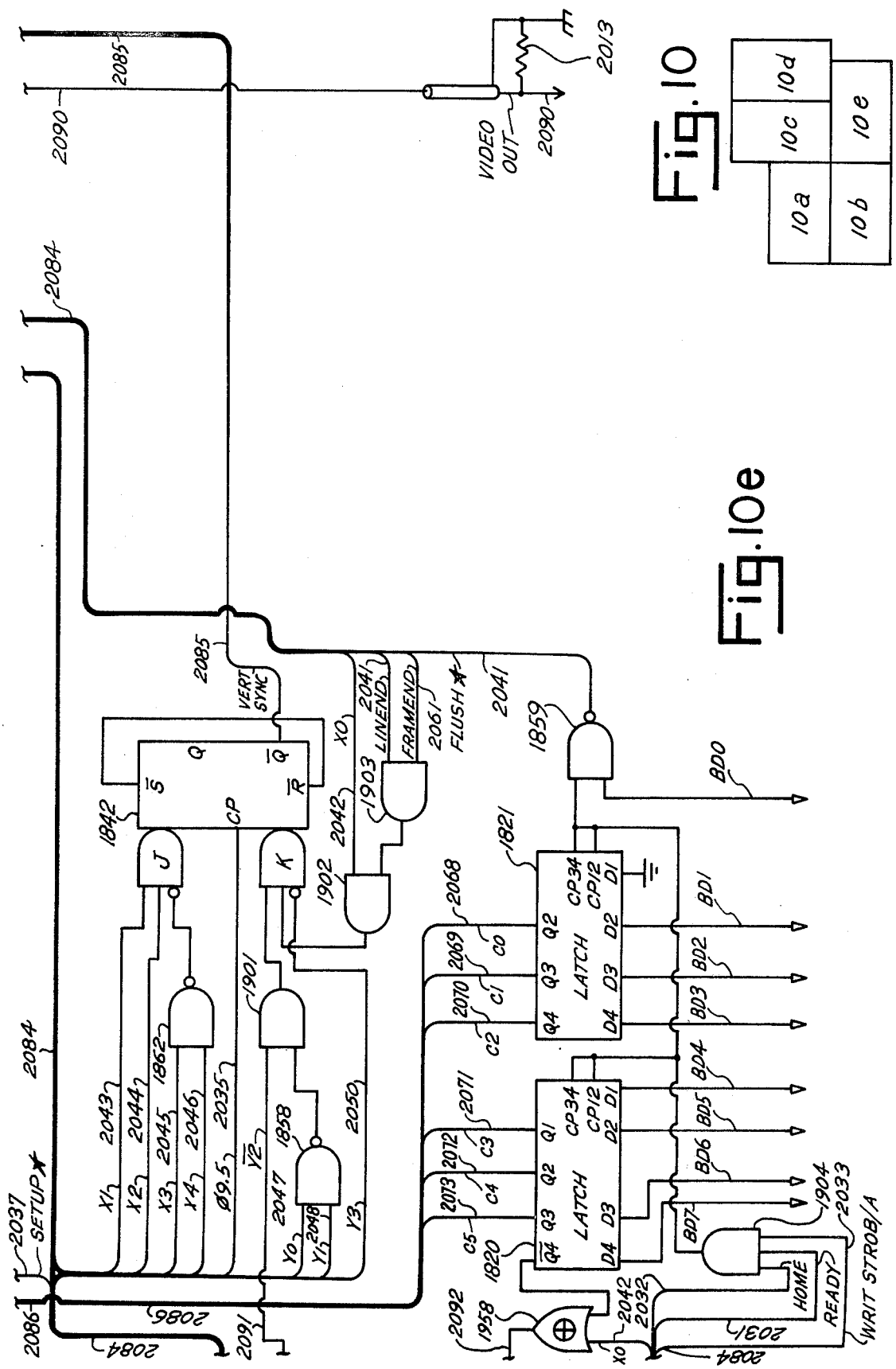
Figure 10C:
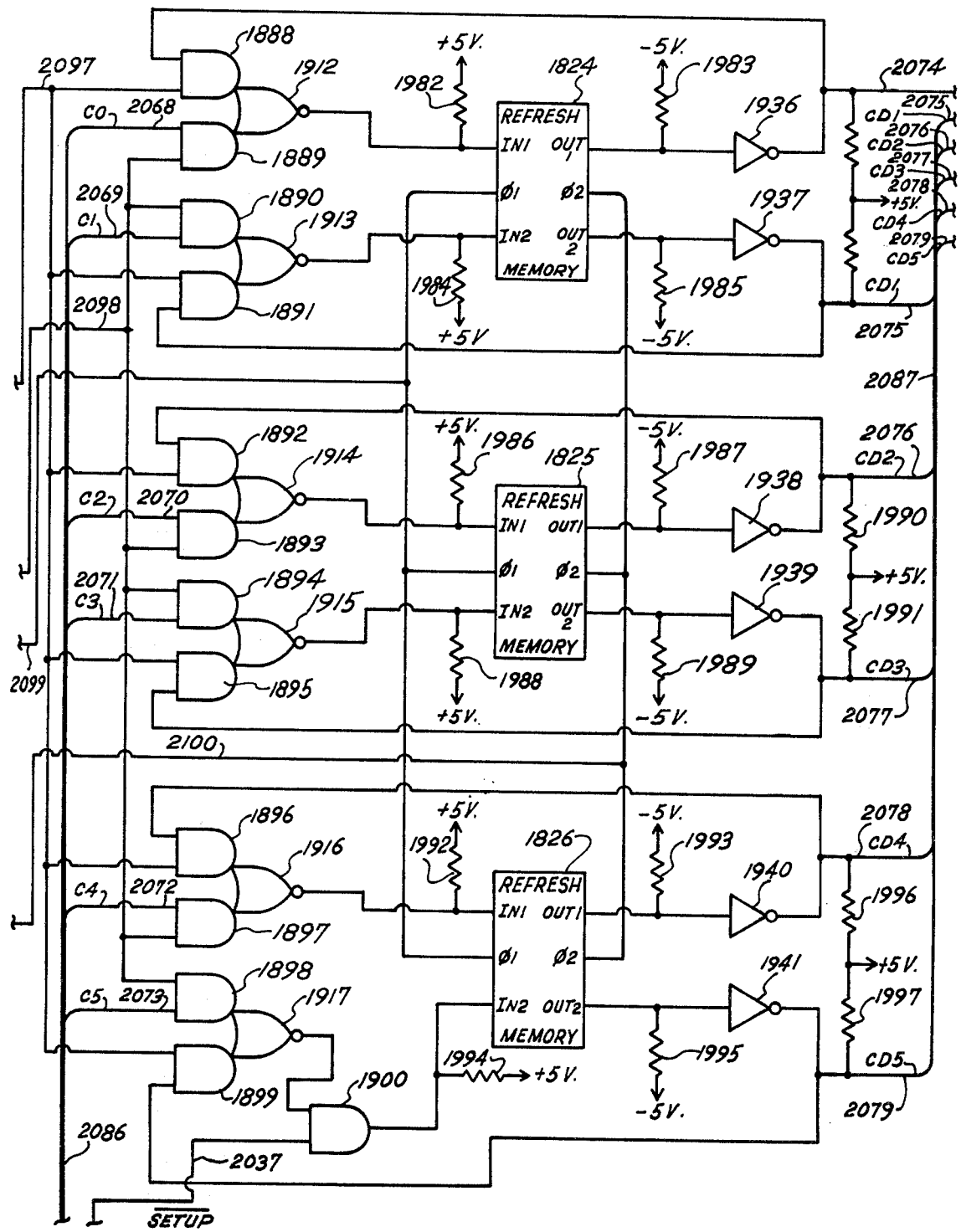

Referring to FIGS. 10–10e, information relating to the display data is stored in a character geneator read-only memory 1810. The appropriate data is also generated by a main shift register 1812 and dot display shift registers 1814, 1815. Data identifying the type of information to be displayed, as well as the location of the information on the CRT face, is received and stored in data display address registers 1818, 1819 and character identification latches 1820, 1821.

Controller 1800 also includes refresh buffer memories 1824-1826, a line counter 1829, a character row-line counter 1830, a row-line counter 1831, additional electron gun to be divided into rows and lines within a row. A total of 512 characters may be placed on the screen at any one time. The character set normally stored in read-only memory 1810 is described in the following Table S:

TABLE S

| | | CHARACTER SET FOR DISPLAY | | | | | |
|---|---|---|---|---|---|---|---|
| OCTAL CODE | CHARACTER | OCTAL CODE | CHARACTER | OCTAL CODE | CHARACTER | OCTAL CODE | CHARACTER |
| 00 | @ | 20 | P | 40 | (Blank) | 60 | 0 |
| 01 | A | 21 | Q | 41 | ' | 61 | 1 |
| 02 | B | 22 | R | 42 | "(Quote) | 62 | 2 |
| 03 | C | 23 | S | 43 | # | 63 | 3 |
| 04 | D | 24 | T | 44 | $ | 64 | 4 |
| 05 | E | 25 | U | 45 | % | 65 | 5 |
| 06 | F | 26 | V | 46 | & | 66 | 6 |
| 07 | G | 27 | W | 47 | '(Apostrophe) | 67 | 7 |
| 10 | H | 30 | X | 50 | ( | 70 | 8 |
| 11 | I | 31 | Y | 51 | ) | 71 | 9 |
| 12 | J | 32 | Z | 52 | * | 72 | : |
| 13 | K | 33 | [ | 53 | + | 73 | ; |
| 14 | L | 34 | \ | 54 | , (Comma) | 74 | < |
| 15 | M | 35 | ] | 55 | - | 75 | = |
| 16 | N | 36 | ↑ (Overflow) | 56 | . (Period) | 76 | > |
| 17 | O | 37 | ← | 57 | / | 77 | ? | counters 1832, 1833, J-K flipflops 1836-1842, one-shot multi-vibrators 1845, 1846, NAND gates 1849-1864, AND gates 1865-1906, NOR gates 1908-1920, an OR gate 1924, inverters 1928-1946, Exclusive OR gates 1950-1958, a logic gate 1959, diodes 1961-1964, resistors 1967-2013, and capacitors 2020-2027. The components are connected by conductors 2031-2079 which are schematically shown as merging together into cables 2084-2087. Of course, in practice, the conductors remain isolated from each other. The entrance and exit points from the cables are clearly shown both by the numbers of the conductors at both ends and also be mnemonic identification codes drawn beside the conductors. Additional conductors 2090-2100 are also used in order to interconnect the components.

Operation of the Character Controller 1800

The control of information placed on CRT 192 is maintained completely by character controller 1800 The controller has refresh capabilities to continue refreshing data on the CRT screen. Once the set of characters has been inputted to the controller by the data processor, this same set of characters will be refreshed until a new command is received.

Figure 11:
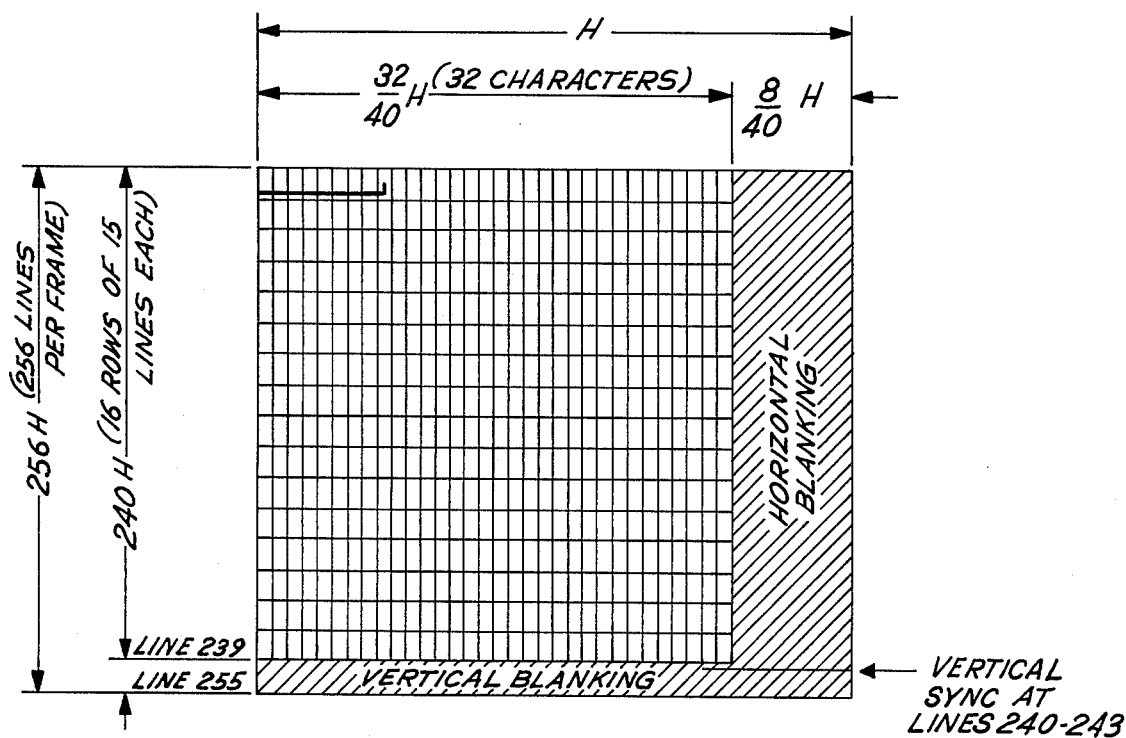
FIG. 11 is a schematic illustration of the manner in which the CRT display shown in FIG. 1 is divided by scanning into rows and columns.

For purposes of character display, CRT screen 192 is divided into 16 horizontal rows (row 0 at the top to row 15 at the bottom) and 32 vertical columns (column 0 at the left to column 31 at the right) (See FIG. 11). CRT 192 includes an electron beam-producing electron gun which scans the face of the CRT with a predetermined number of parallel beam scan lines at a predetermined rate. Each line is scanned at the same predetermined rate during a time period having a predetermined duration. Character controller 1800 includes a clock, a line counter and a row counter which enable the scan of the Only one character is entered into the controller registers 1818-1821 at a time, and each time a row and column must be specified in a CHARACTER CONTROLLER WRITE CHARACTER OUTPUT COMMAND shown in Table 17:

TABLE 17

| CHARACTER CONTROLLER WRITE CHARACTER OUTPUT COMMAND | | | | | | | | | |
|---|---|---|---|---|---|---|---|---|---|
| AD2 | AD3 | AD4 | AD5 | AD6 | AD7 | BD0 | BD1 – BD6 | BD7 – BD11 | BD12 – BD15 |
| 1 | 1 | 1 | 0 | 0 | 1 | 0 | ←—Character—→ | ←—Column—→ | ←—Row—→ |

As shown in Table 17, the address of the character controller is transmitted to conductors AD2-AD7, the BD0 conductor is set to its 0 state, the binary code of the character to be entered into the controller is transmitted to conductors BD1-BD6, the column in which the character is to be displayed is transmitted to conductor BD7-BD11, and the row in which the characters are to be displayed is transmittted to conductors BD12-BD15. The signals by which the column and row are identified constitute display address signals which determine the location on CRT screen 192 at which the character is displayed. These address signals are normally stored in read-only memory 1094.

After the character is stored in the character controller, it it outputted to the CRT screen and the SW0 conductor is set to its 1 state, indicating that a new character can be accepted. The data processor can read the status of the ready/busy flag on conductor SW0 by issuing a CHARACTER CONTROLLER STATUS INPUT COMMAND shown in Table 18.

TABLE 18

| CHARACTER CONTROLLER STATUS INPUT COMMAND | | | | | | |
|---|---|---|---|---|---|---|
| AD2 | AD3 | AD4 | AD5 | AD6 | AD7 | SW0 |
| 1 | 1 | 1 | 0 | 0 | 1 | 0 = busy<br>1 = ready |

The approximate time required to store and display one character is about 1.1 millisecond.

By issuing a CHARACTER CONTROLLER FLUSH OUTPUT COMMAND shown in Table 19, the data processor can erase the CRT screen and all previous character data. TABLE 19

TABLE 19

| CHARACTER CONTROLLER FLUSH OUTPUT COMMAND | | | | | | |
|---|---|---|---|---|---|---|
| AD2 | AD3 | AD4 | AD5 | AD6 | AD7 | BD0 |
| 1 | 1 | 1 | 0 | 0 | 1 | 1 |

The erase operation takes about 7,0 milliseconds. No reset is required, simply a CHARACTER CONTROLLER STATUS INPUT COMMAND to sense the ready/busy flag.

In order to properly position the characters on the CRT screen, the character controller produces a HOR-BLANK signal at the end of each line. At the end of each of 15 HORBLANK pulses, the controller knows that a row has been completed, and therefore, generates a ROWEND pulses. In addition, when the entire face of the CRT screen has been scanned, the controller produces a FRAMESTART pulse indicating that a new frame has started. These pulses are used by the character controller in order to insure that video information is transmitted to the monitor over conductor 2090 (FIG. 10e) at the proper instant to place the character in the correct position on the CRT face. The characters can be displayed on the CRT screen in a character group consisting of one or more characters.

System Processing, Management and Operation

The preferred embodiment of the present invention is structured around data processor 1090 which is a 16 bit, parallel bus microprocessor having multiple accumulators, a LIFO stack, and a microinstruction set implemented in a control read-only memory for interpretation and execution of macro-level assembly language instructions.

Data processor 1090 manages the acquisition of voltage or current information about the electrical power signal transmitted to starter 126, processes the information, and displays the resulting engine compression in alphanumeric form on CRT face 192 of display monitor 190.

To begin operation, the processor initializes the system. For example, the processor establishes a cylinder counter register and a cycle counter register in the memory and sets both of them equal to 0 . In addition, the number 1 cylinder (i.e., cylinder 101) is selected by storing the bits 0000 in latch 1478 (FIG. 9b) in response to a CYLINDER SELECT OUTPUT COMMAND (Table 7).

The engine is then cranked by moving ignition switch 124 to the position shown in FIG. 2a so that an electrical power signal is transmitted from the battery to the starter motor. In response to the signal, the starter motor rotates the engine in the manner previously described.

Figure 13:
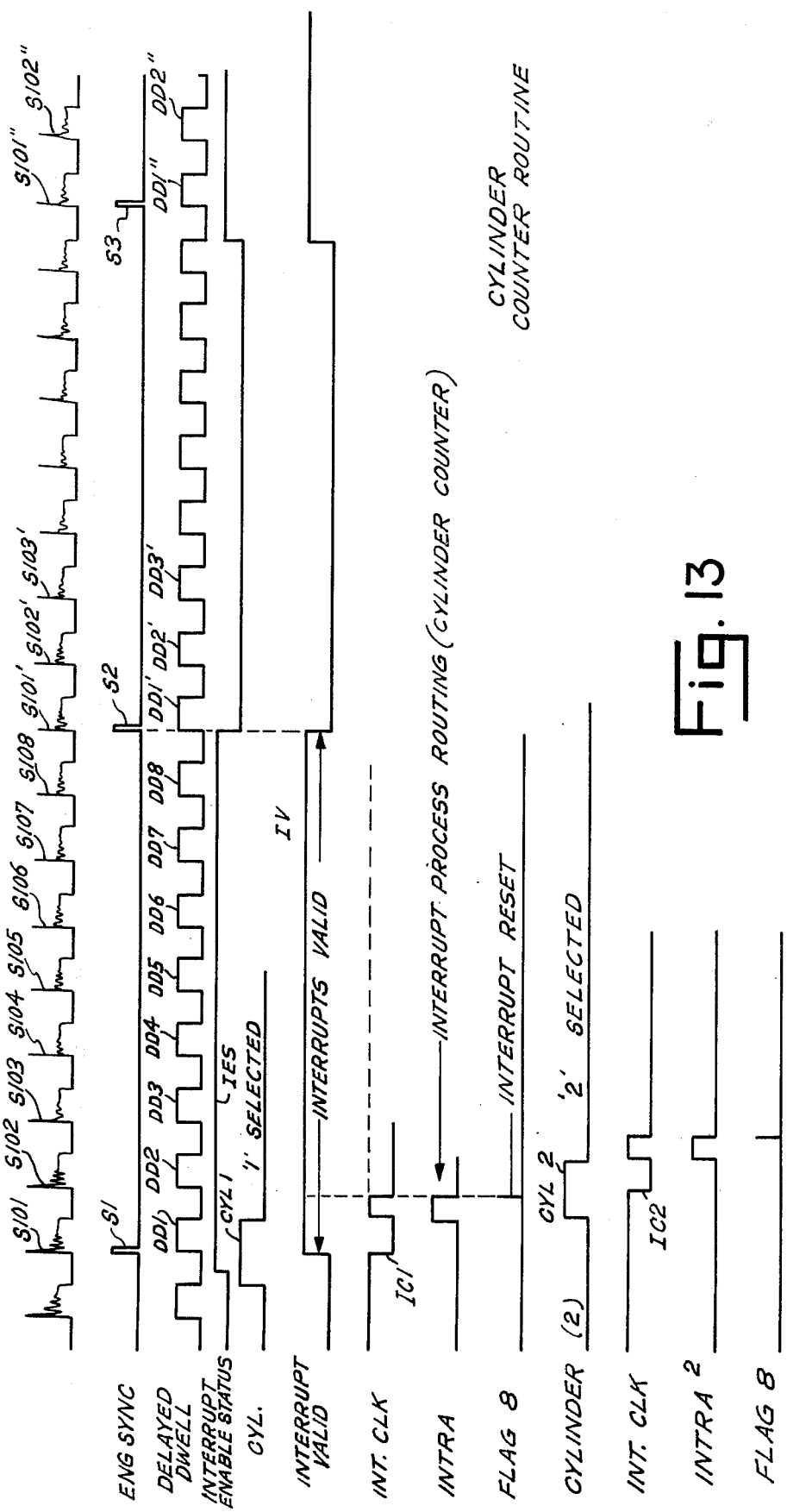
FIG. 13 illustrates exemplary voltage waveforms produced by the circuit shown in FIG. 9d.

Referring to FIG. 13, in response to the rotation of the engine, the ignition system produces secondary ignition pulses S101–S108 as cylinders 101–108, respectively, are in their compression and spark phases (FIG. 1b). In response to each S101 secondary pulse (which is used to fire the number 1 cylinder) the trigger generator produces an ENGINE SYNC pulse, such as pulses S1 and S2. In response to each of the secondary signals, primary interface circuit 360 produces delayed dwell signals, such as DD1–DD8 (FIG. 13). Since the number 1 cylinder was selected by storing the bits 0000 in latch 1478, a CYL PULSE (e.g., CYL1) is produced on conductor 1516 (FIG. 9b) each time the number 1 cylinder is fired.

Referring to FIG. 9b, in response to the simultaneous production to ENGINE SYNC and CYL pulses, flipflop 1564 produces an INTERRUPT ENABLE STATUS pulse (IES) in the manner shown in FIG. 13. The IES pulse, in turn, is used to clock flipflop 1565 which produces an INTERRUPT VALID signal (IV) that provides one input to AND gate 1570. Assuming the IV, CYL and DELAY DWELL signals are all in their one states, AND gate 1570 and inverter 1582 produce the INTERRUPT CLOCK (IC) signal shown in FIG. 13. This signal in turn, generates an interrupt signal (INTRA 1) by means of flipflop 1566 and driver 1590. As soon as the INTRA 1 signal is detected by the data processor over conductor T7, the main software program is interrupted and jumps to location 0001 in the program memory. This location contains a jump instruction which causes the program to jump to the beginning of an interrupt subroutine shown in the flow chart of FIG. 12.

In step S2, the contents of the registers used in the main program are stored so that the data will not be lost when the main program is resumed. Assuming the INTERRUPT ENABLE STATUS signal (IES) is in its 1 state, the cylinder counter is incremented (step S4). The data processor can determine whether the INTERRUPT ENABLE STATUS is 1 by issuing a CYLINDER READ INPUT COMMAND (Table 7A), and by noting the status of line SW3.

In step S5, the data processor determines whether the cylce count is greater than 0. During the initial engine cycle (i.e., the engine cycle in which secondary pulses S101–S108 are generated), the cyle count is 0 . As a result, the next cylinder (cylinder number 102) is selected in step S6. As previously explained, the cylinder is selected by issuing a CYLINDER SELECT OUTPUT COMMAND (Table 7). All of the registers then are loaded in step S7, and the INTRA pulse is reset in step S8 by issuing a FLAG 8 command over conductor T5 (FIG.9d). As soon as the FLAG 8 command is generated, the INTRA 1 signal is switched from its 1 to 0 state (FIG. 13). In step S9, the interrupt subroutine then jumps back to the main program.

Shortly after returning to the main program, secondary signal S102 is generated in order to fire the number 2 cylinder (i.e., cylinder 102). In response to signal S102, delay dwell signal DD2 is generated and the data processor produces the CYL 2 signal on conductor 1516. In response to all of these signals, the INTERRUPT CLOCK signal IC2 is generated in order to produce a second interrupt signal INTRA 2 (FIG. 13). After the data processor detects the presence of the INTRA 2 signal, the main program is interrupted, and the processor again jumps to the interrupt subroutine shown in FIG. 12. Steps S2–S9 are then repeated in the same manner previously described until the main program is resumed.

The main program is interrupted in response to each one of secondary signals S101–S108 so that the cylinder counter holds the number 8 as the next engine cylce is entered by the generation of secondary signal S101' (FIG. 13). In response to secondary signal S101'

, ENGINE SYNC signal S2 is generated so that the Q output of flipflop 1564 is returned to its 0 state. As a result, the IES signal also returns to its 0 state so that the date processor determines in step S3 that the INTERRUPTED ENABLE STATUS is not equal to 1. In response to this decision, the cylinder counter, which holds the number 8, is stored in step 10, and eight memory locations are reserved for data corresponding to the 8 cylinders in step S11. This is an important feature which enables a separate memory location to be assigned to each preselected cylinder. In this manner, date pertaining to a particular cylinder can be separated from data pertaining to other cylinders, so that the data for each cylinder can be displayed readily.

The INTERRUPT VALID mask is reset in step S12 by issuing a FLAG 14 command over conductor T6. The FLAG 14 commands reset the Q output of flipflop 1565 to its 0 state, Thereafter, until ENGINE SYNC pulse S3 is generated, AND gate 1570 prevents the generation of any interrupt (INTRA) signals.

In step S13, the cycle counter is incremented to 1, and in step S14, the cylinder counter is again set equal to 0 . The number 1 cylinder is selected in step S15 by issuing another CYLINDER SELECT OUTPUT COMMAND (Table 7). The subroutine then returns to the main program through step S7–S9 in the manner previously described.

During the third engine cycle, secondary signal S101", ENGINE SYNC signal S3 and DELAY DWELL signal DD1" all are generated so that the IES and IV signals both return to their 1 states. Another interrupt (INTRA) signal is generated in the manner previously described, and the main program jumps to the subroutine shown in FIG. 12. This time, the subroutine follows steps S1–S5. However, since the cycle count is now equal to 1 , and the cylinder count is equal to 1 , cylinder number 2 is selected in step S18, and an appropriate cylinder output command is issued. The main program is then resumed through steps S7–S9.

Figure 12:
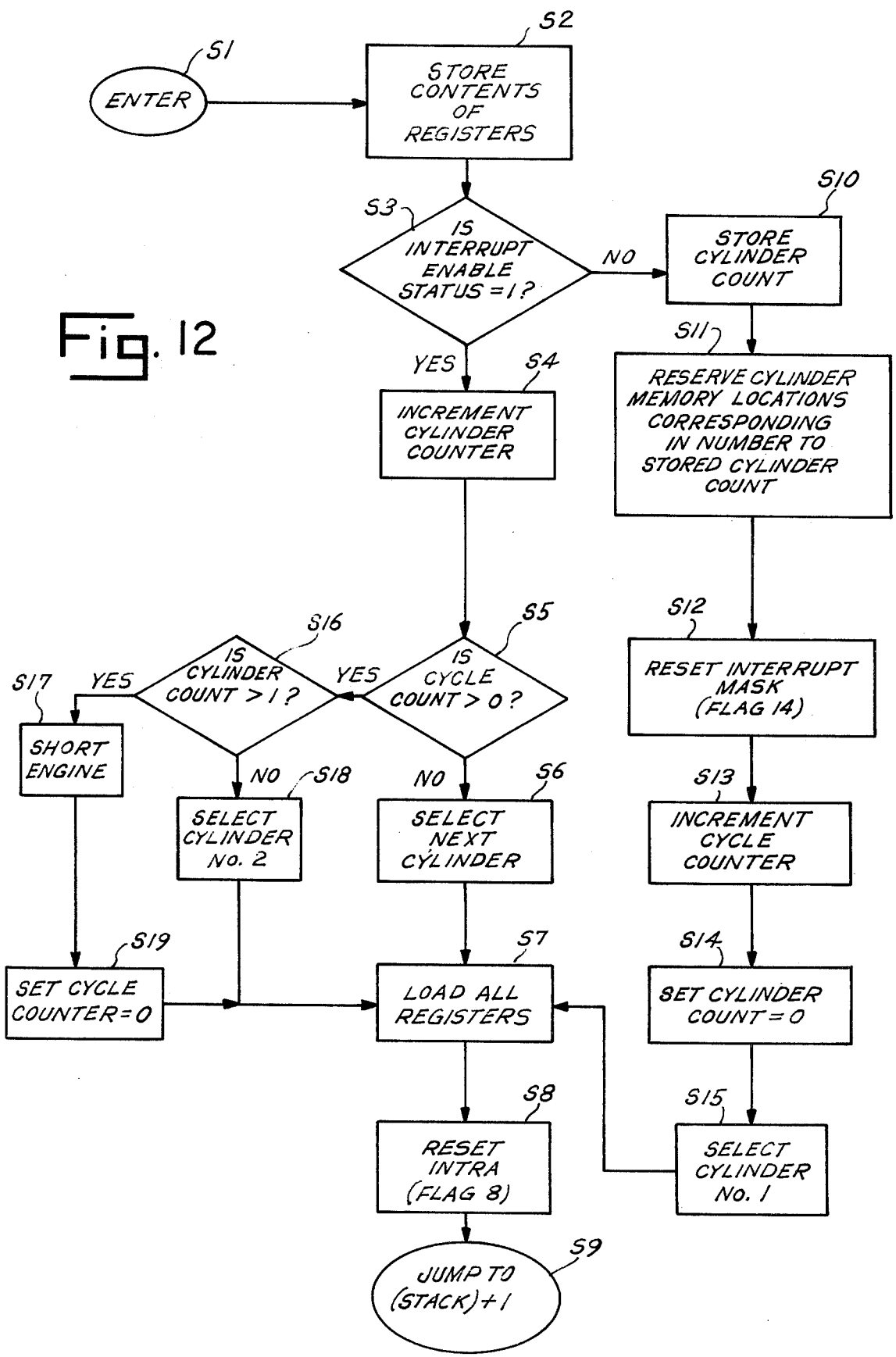
FIG. 12 is a flowchart illustrating a preferred hardware interrupt subroutine by which the number of chambers in the engine are counted and the engine thereafter is started.

During the generation signal S102", another interrupt (INTRA) signal is generated, and the main program again jumps to the subroutine shown in FIG. 12. At this time, steps S1–S5 are followed. Since the cylinder count is greater than 1, step S16 enables the engine to be shorted in step S17.

The engine is shorted by issuing a CYLINDER SELECT OUTPUT COMMAND and by setting conductor BD5 equal to 1. In response to this command, the flipflop comprising NAND gates 1577–1578 set conductor 1581 equal to its 0 state. As a result, AND gate 584 (FIG. 7) switches triac 562 to its conductive state, so that the ignition system is shorted to ground potential. The engine continues to be cranked by the starting motor order, but is prevented from starting.

In step S19, FIG. 12, the cycle counter is returned to 0, and the main program is entered through step S7–S9.

The main program transmits the stored cylinder count to latch 1592 (FIG. 9d) over conductors BD0-BD3 by issuing a CYLINDER SELECT OUTPUT COMMAND (Table 7). The cylinder count then is decoded in decoder 1594, and the line within group 1438–1442 (FIG. 9a) corresponding to the number of cylinders in the engine is grounded.

In summary, the subroutine shown in FIG. 12 cooperates with the circuitry shown in FIG. 9d in order to automatically count the number of cylinders or chambers in the engine. Thereafter, the engine is prevented from starting so that it may continue to be cranked in order to determine the relative compression of the cylinders. In addition, a separate memory location is set aside to store data from each particular cylinder.

As the starter motor continues to rotate the engine, the current through the battery drawn by the starter motor fluctuates in the manner shown in FIG. 2. A portion of the electrical power signal waveform corresponding to the time during which the number 1 cylinder (cylinder 101) is in the intake and compression phases of its cycle (FIGS. 1a and 1b) is redrawn in FIG. 14. The data processor automatically samples the amplitude of the current waveform at least 50 times per second. However, for purposes of illustration, only 24 samplings V1–V24 are illustrated in FIG. 14.

Figure 15A:
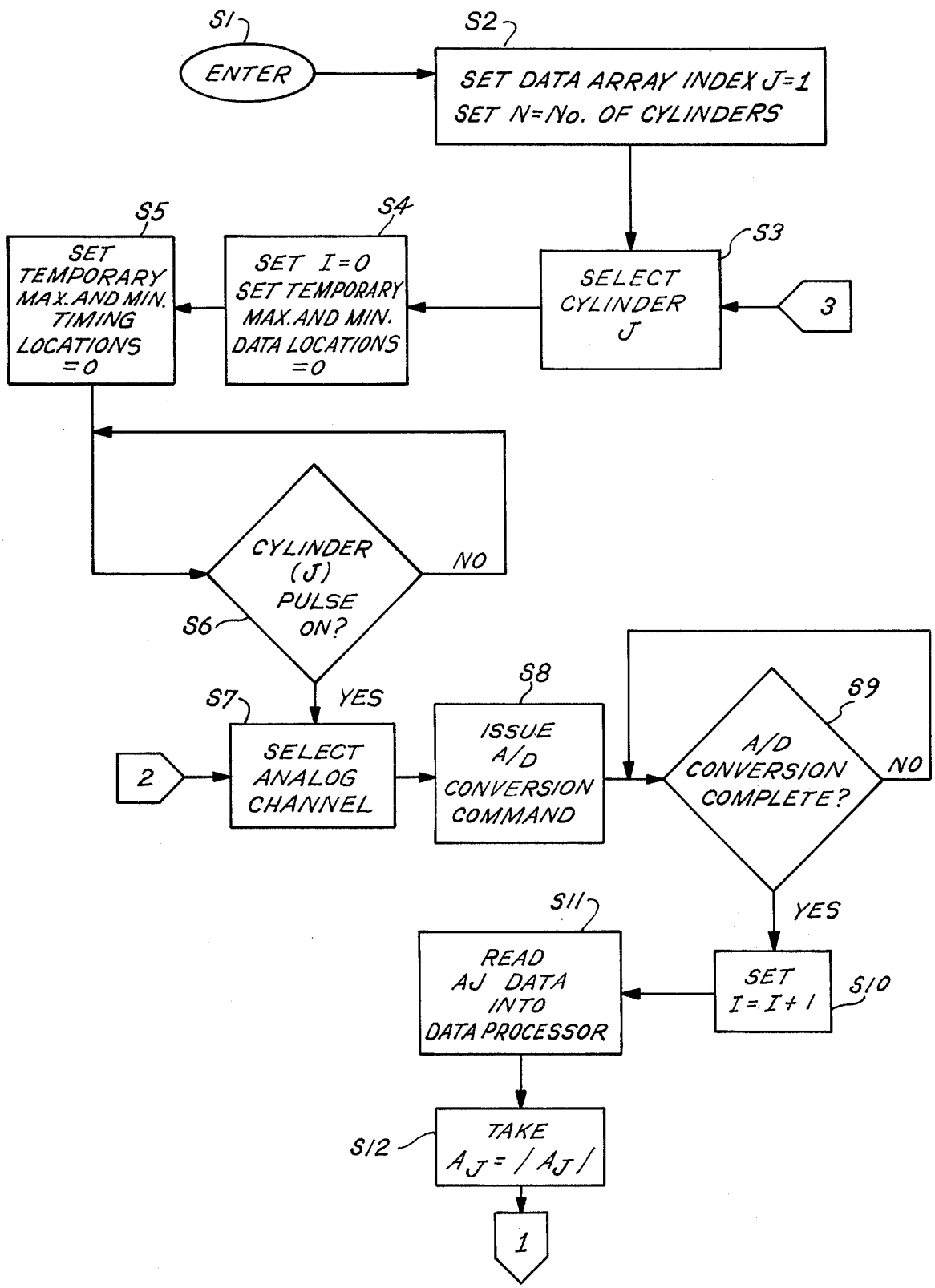
FIGS. 15a–15c are flowcharts illustrating a preferred manner in which the data processor evaluates the current or voltage waveform of the electrical power signal illustrated in FIG. 2 in order to determine the relative compression of engine 100.
Figure 15B:
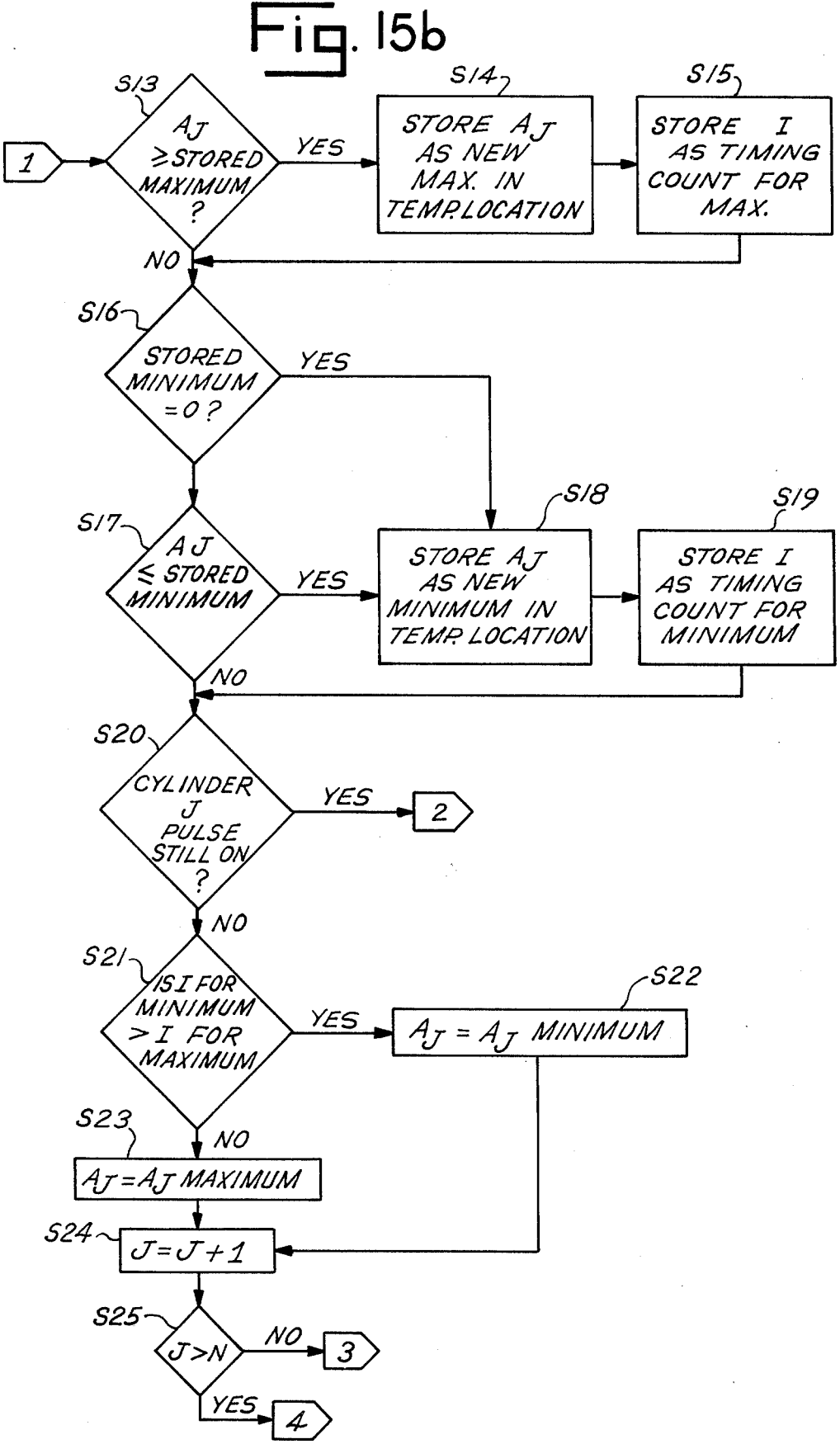
Figure 15C:
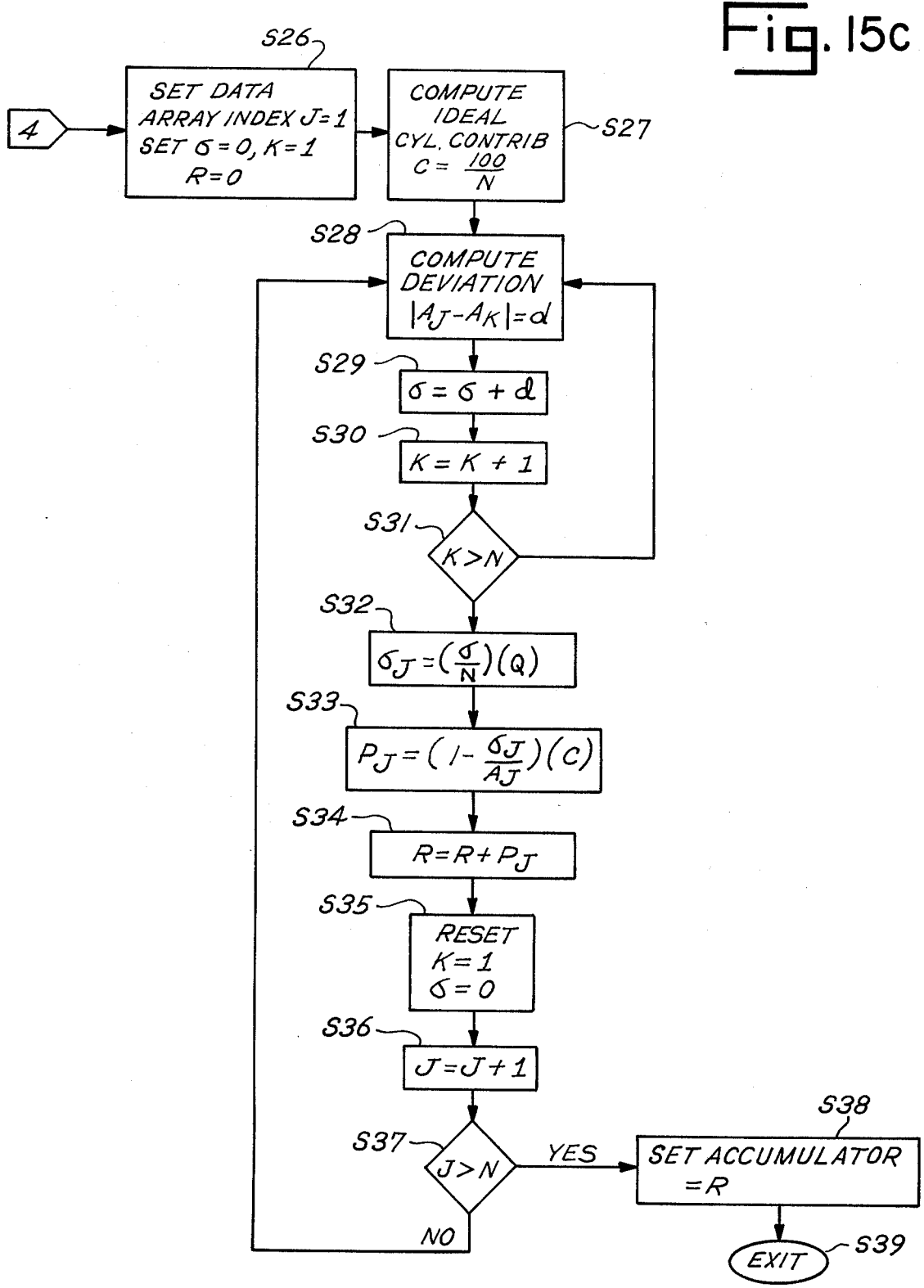

The flow chart illustrating the manner in which data processor 1090 cooperates with analog control 1100 and counting, cylinder control 1400 is illustrated in FIGS. 15a–15c. In step S2, the data processor establishes a data array in it random access memory (RAM), sets the data array index J = 1, and sets N equal to the number of cylinders (e.g., 8) determined by the interrupt subroutine. In step S3, cylinder J is selected for analysis. In the present example, since J = 1, the number 1 cylinder, cylinder 101, is analyzed first. Cylinder 1 is selected when the data processor issues a CYLINDER SELECT OUTPUT COMMAND (Table 7) in which cylinder 1 is identified on data output conductors BD0-BD3.

In step S4, a memory location I is established in the data processor and is set equal to 0. In addition, temporary maximum and minimum data locations are established in the memory and set equal to 0.

In step S5, temporary maximum and minimum timing locations are established in the memory and set equal to 0.

In step S6, the data processor determines whether the cylinder pulse selected at S3 is one. As previously explained, this step is performed by issuing a CYLINDER READ INPUT COMMAND (Table 7A). If the cylinder pulse shown in FIG. 12 is in its 1 state, the actual amps output of ammeter circuit 610 is selected by issuing an ADC FLAG RESET OUTPUT COMMAND (Table 1), and an ADC CONVERSION OUTPUT COMMAND. After the ammeter circuit 610 has been properly ranged, an analog-to-digital conversion command is issued in step S8 by transmitting an ADC CONVERSION OUTPUT COMMAND (Table 4), in which the actual amps input conductor 660 to multiplexer 1350 is activated.

In step S9, the data processor determines whether the analog-to-digital conversion is complete by issuing an INPUT STATUS REGISTER INPUT COMMAND (Table 5). Assuming the conversion is complete, the data processor indexed the I memory location by one, and then reads the discrete digitial amplitude signals in buffer gates 1367, 1368 into the data processor in step S11 by issuing a READ ADC INPUT COMMAND (Table 6). After taking the absolute value of the amplitude signal AJ in step S12, the data processor determines whether the amplitude signal is the maximum signal or the minimum signal associated with the selected cylinder. If the most recent amplitude signal read into the data processor is greater than the maxiumum value stored in the maximum data location in memory, the most recent amplitude signal is stored as the new maximum value, and the timing signal I associated with this amplitude signal is stored in the temporary maximum timing location (see steps S13–S15). If the maximum value is less than the value of the signal stored in the temporary minimum data location, the most recent amplitude signal is stored as the new minimum value in the minimum data location and the timing signal associated with this amplitude signal is stored in the temporary minimum timing location.

If the cylinder (CYL) pulse is still on (i.e., in a 1 state), the actual amps analog channel is again selected by returning to step S7, and a new analog-to-digital conversion takes place. The amplitude signal resulting from the new conversion is then tested to determine whether it is a new maximum or a new minimum value in the manner previously described in steps S13–S19.

This process continues as long as the CYL pulse for the selected cylinder continues to be on. The process is illustrated in FIG. 14, wherein discrete digital amplitude signals corresponding in values to points V1–V24 are sampled by taking analog-to-digital conversions at time T1–T24, respectively. After each one of the conversion is completed, the I location in memory is indexed by one so that the relative times at which the amplitude signals are produced can be stored in memory. The conversions occur at the rate of at least 500 per second so that sufficient data will be generated to accurately represent the instantaneous amplitude values of the electrical power signal. Preferably, a rate of approximately 200 conversions per second is employed.

After the CYL pulse goes off (e.g., after time T24), the data processor compares the I value stored in the maximum and minimum timing locations. If the I value for the minimum timing location is greater than the I value for the maximum timing location, the minimum amplitude signal value stored in the minimum data locations is stored in memory as the representative signal which represents the compression of the selected cylinder. That is, the minimum value is used to represent the cylinder if the minimum amplitude signal occured after maximum amplitude signal for the selected cylinder.

If the I value stored in the minimum timing location is less than the I value stored in the maximum timing location, the amplitude signal value stored in the maximum date location is stored in a new location in memory as a representative signal which represents the compression of the selected cylinder. In other words, the maximum amplitude signal value is used to represent the selected cylinder if the maximum value signal occured after the minimum value signal.

The foregoing process is repeated for all cylinders of the engine until one representative signal is stored for each of the cylinders. (Steps S24 and S25). The representative signals are stored in the memory locations preselected in step S11 of the interrupted outline (FIG. 12). As a result, the representative signal corresponding to any preselected cylinder can be easily displayed. As soon as all cylinder of the engine are represented by a representative signal value, the data processor determines the relative compression of the engine by solving the equation.

$$R = \sum_{J=1}^{N} \left[ 1 - \left( \sum_{K=1}^{N} \frac{|A_J - A_K|^{(Q)}}{N} \middle/ A_J \right) \right] \left( \frac{100}{N} \right)$$

where $Q$ is a constant.

The data processor solves this equation by executing the steps described in the flow chart of FIG. 15c. After the relative compression digital signal R has been calculated in step S38, the number is displayed on CRT face 192 by character controller 1800 opposite a legend reading REL. COM. The manner in which this data is displayed is described previously in connection with character controller 1800.

The voltage of the electrical power signal transmitted from the battery to the starter motor can be used in order to analyze the relative compression of the engine simply be selecting the proper analog channel in step S8 so that volts range conductor 749 (FIG. 8a) and volts input conductor 748 to multiplexer 1350 are used during the analog-to-digital conversion (steps S8, S9 and S11).

After the relative compression is calculated, CYLINDER SELECT OUTPUT COMMAND (Table 7) is issued and BD5 is held in its 0 state (FIG. 9d). This command releases the ignition shorting circuit (FIG. 5) so that the engine will start. Alternatively, a FLAG 14 command can be issued. A detailed program listing capable of implementing the preceding flow charts on an IMP-163 data processor is as follows:

```
0974  0000  A
0975  0000  A
0976  0000  A 0180
      01A8

0977  81C1  A           START:
0978  A029  B
0979  8068  B
097A  A027  B
097B  4F94  A
097C  4C01  A
097D  A019  B
097E  0600  A
097F  4F00  A

0980  AC36  B
0981  3C81  A
0982  4F84  A
0983  0600  A
0984  4C00  A
0985  A090  B
```

| | |
|---|---|
| 0986 A059 B | |
| 0987 A055 B | |
| 0988 A05A B | |
| 0989 A056 B | |
| 098A 2DAF A@ | |
| 098B 2104 A | |
| 098C 4E01 A | |
| 098D A210 B | |
| 098E 4CFF A | |
| 098F 25AB A@ | |
| 0990 4F88 A | |
| 0991 4C01 A | |
| 0992 0600 A | |
| 0993 4F84 A | |
| | |
| 0994 81A7 A | |
| 0995 0600 A | |
| 0996 81A6 A | |
| 0997 0600 A | |
| 0998 2DA5 A@ | |
| 0999 1502 A | |
| | |
| 099A 4CFF A | |
| 099B 217E A | |
| 099C 4F84 A | |
| 099D 0400 A | |
| 099E 61D2 A | |
| 099F F1D2 A | |
| 09A0 2179 A | |
| 09A1 F12A A | |
| 09A2 2177 A | |
| 09A3 E1CE A | |
| 09A4 2101 A | |
| 09A5 5001 A | |
| 09A6 61CB A | |
| 09A7 3381 A | |
| 09A8 7890 B | |
| 09A9 8490 B | |
| 09AA E5C8 A | |
| 09AB 2101 A | |
| 09AC 21DF A | |
| | |
| 09AD E056 B | |
| 09AE 2102 A | |
| 09AF A056 B | |
| 09B0 A455 B | |
| 09B1 1107 A | |
| 09B2 805A B | |
| 09B3 1103 A | |
| 09B4 EC5A B | |
| 09B5 2101 A | |
| 09B6 2102 A | |
| 09B7 AC5A B | |
| 09B8 A459 B | |

| | |
|---|---|
| 09B9 4FB4 A | |
| 09BA 0400 A | |
| 09BB 14D4 A | |
| | |
| 09BC 8059 B | |
| 09BD E055 B | |
| 09BE 2102 A | |
| 09BF 805A B | |
| 09C0 2101 A | |
| 09C1 8056 B | |
| 09C2 B029 B | |
| | |
| 09C3 7829 B | |
| 09C4 8C36 B | |
| 09C5 4B02 A | |
| 09C6 EC68 B | |
| 09C7 FC68 B | |
| 09C8 4F01 A | |
| 09C9 7C27 B | |
| | |
| 09CA 21B5 A | |
| 09CB 210B A | |
| 09CC 0200 A | |
| 09CD 0000 A | |
| 09CE 0000 A | |
| 09CF 0000 A | |
| 09D0 0000 A | |
| 09D1 0000 A | |
| 09D2 0000 A | |
| 09D3 0000 A | |
| 09D4 0000 A | |
| 09D5 0000 A | |
| 09D6 0000 A | |
| | |
| 09D7 4C00 A | |
| 09D8 A026 B | |
| 09D9 859A A | |
| 09DA 8C68 B | |
| 09DB 2D99 A@ | |
| 09DC A428 B | |
| 09DD 8068 B | |
| 09DE A090 B | |
| 09DF 8196 A | |
| 09E0 A029 B | |
| 09E1 3381 A | |
| 09E2 8068 B | |
| 09E3 A027 B | |
| 09E4 4E00 A | |
| 09E5 9029 B | |

```
09E6  8700  A
09E7  5001  A
09E8  3400  A
09E9  1201  A
09EA  5001  A
09EB  3200  A
09EC  4B01  A
09ED  7C27  B
09EE  21F6  A
09EF  3981  A
09F0  4C0A  A
09F1  2DDB  A@
09F2  4C00  A
09F3  4300  A
09F4  8C68  B
09F5  2DD8  A@
09F6  4905  A
09F7  4C00  A
09F8  4F0A  A
09F9  2DD4  A@
09FA  81D4  A
09FB  2DD1  A@

09FC  9C29  B
09FD  2DD9  A@
09FE  4E00  A
09FF  D5D0  A
0A00  3481  A
0A01  1202  A
0A02  5101  A
0A03  2101  A
0A04  4E01  A
0A05  8023  B
0A06  2DC6  A@
0A07  8DC8  A
0A08  2DC5  A@

0A09  3881  A
0A0A  1101  A
0A0B  5101  A
0A0C  C426  B
0A0D  A426  B

0A0E  4700  A
0A0F  7829  B
0A10  DC68  B
0A11  8068  B
0A12  7C90  B
0A13  21CF  A

0A14  8426  B
0A15  4905  A
0A16  4C00  A

0A17  4F0A  A
0A18  2DB5  A@
0A19  3481  A
0A1A  4E00  A
0A1B  A819  B
0A1C  4D18  A
0A1D  25B3  A@

0A1E  03E8  A
0A1F  0000  A
0A20  0000  A
0A21  0000  A
0A22  0000  A
0A23  0000  A
0A24  0000  A
0A25  0000  A
0A26  0000  A
0BC2  3C81  A
0BC3  8861  B
0BC4  5EFE  A
0BC5  3981  A
0BC6  6506  A
0BC7  7504  A
0BC8  D502  A
0BC9  2132  A
0BCA  03FF  A
0BCB  0040  A
0BCC  0080  A
0BCD  00BF  A
0BCE  01FF  A
0BCF  0200  A
0BD0  0003  A
0BD1  0002  A
0BD2  005B  A
0BD3  001C  A
0BD4  01FF  A
0BD5  0000  A
0BD6  0000  A
0BD7  0000  A
0BD8  0000  A
0BD9  0000  A
0BDA  0000  A

0BDB  4C01  A
0BDC  A040  B

0BDD  AC8D  B
0BDE  4FB3  A
0BDF  0400  A
0BE0  4C00  A
0BE1  A03A  B
0BE2  A010  B
```

| | |
|---|---|
| 0BE3 | 4F88 A |
| 0BE4 | 0400 A |
| 0BE5 | 1314 A |
| 0BE6 | 3040 B |
| 0BE7 | 1502 A |
| 0BE8 | 2DEC A@ |
| 0BE9 | 2DEC A@ |
| 0BEA | 4F68 A |
| 0BEB | 0400 A |
| 0BEC | 61EA A |
| 0BED | C03A B |
| 0BEE | A03A B |
| 0BEF | E1E8 A |
| 0BF0 | 21F2 A |
| 0BF1 | 4C01 A |
| 0BF2 | A010 B |
| 0BF3 | 4C00 A |
| 0BF4 | 8C8D B |
| 0BF5 | 4000 A |
| 0BF6 | 4C00 A |
| 0BF7 | A040 B |
| 0BF8 | 4400 A |
| 0BF9 | 0200 A |
| 0BFA | 4CFF A |
| 0BFB | 21F8 A |
| 0BFC | 4000 A |
| 0BFD | 8094 B |
| 0BFE | A095 B |
| 0BFF | 4C07 A |
| 0C00 | 3483 A |
| 0C01 | 7158 A |
| 0C02 | 6958 A |
| 0C03 | A06C B |
| 0C04 | 5DFD A |
| 0C05 | 4C07 A |
| 0C06 | 3483 A |
| 0C07 | A06F B |
| 0C08 | 5DFD A |
| 0C09 | A47E B |
| 0C0A | 4400 A |
| 0C0B | F151 A |
| 0C0C | 2144 A |
| 0C0D | 4E04 A |
| 0C0E | A890 B |
| 0C0F | 4E00 A |
| 0C10 | 4D00 A |
| 0C11 | A465 B |
| 0C12 | 110F A |
| 0C13 | 3181 A |

| | |
|---|---|
| 0C14 | 3481 A |
| 0C15 | 1104 A |
| 0C16 | 4C00 A |
| 0C17 | 4F0A A |
| 0C18 | 2DC0 A@ |
| 0C19 | 7865 B |
| 0C1A | 3200 A |
| 0C1B | 5AFC A |
| 0C1C | 7C90 B |
| 0C1D | 21F6 A |
| 0C1E | 3481 A |
| 0C1F | 1101 A |
| 0C20 | 7865 B |
| 0C21 | 3981 A |
| 0C22 | 1106 A |
| 0C23 | 5DFC A |
| 0C24 | 5C0C A |
| 0C25 | 3100 A |
| 0C26 | 7C6C B |
| 0C27 | 3081 A |
| 0C28 | 7C65 B |
| 0C29 | 8065 B |
| 0C2A | E06F B |
| 0C2B | 2105 A |
| 0C2C | 5DFC A |
| 0C2D | 7C6C B |
| 0C2E | 3081 A |
| 0C2F | 7C65 B |
| 0C30 | 21F8 A |
| 0C31 | 806C B |
| 0C32 | 1205 A |
| 0C33 | 4C4B A |
| 0C34 | 292A A |
| 0C35 | 4C03 A |
| 0C36 | C06C B |
| 0C37 | A06C B |
| 0C38 | 4C0F A |
| 0C39 | 3483 A |
| 0C3A | 2923 A |
| 0C3B | 7C6C B |
| 0C3C | 2102 A |
| 0C3D | 4C2E A |
| 0C3E | 2920 A |
| 0C3F | 5DFC A |
| 0C40 | 3481 A |
| 0C41 | 15F6 A |
| 0C42 | 806C B |
| 0C43 | 12F4 A |

```
0C44  7C7E  B
0C45  2104  A
0C46  807F  B
0C47  1102  A
0C48  4C2D  A
0C49  2915  A

0C4A  8094  B
0C4B  D095  B
0C4C  E10C  A

0C4D  2101  A
0C4E  0200  A
0C4F  4C20  A
0C50  21F8  A

0C51  8010  B
0C52  1502  A
0C53  4C1E  A
0C54  21F4  A
0C55  4C00  A
0C56  A010  B
0C57  4C2A  A
0C58  21F0  A

0C59  0200  A
0C5A  0004  A
0C5B  FFF8  A
0C5C  0003  A
0C5D  FFFF  A

0C5E  C129  A

0C5F  6129  A
0C60  F127  A
0C61  4C0F  A
0C62  5C01  A
0C63  4300  A
0C64  4100  A
0C65  8495  B
0C66  5DF9  A
0C67  4000  A
0C68  2D2B  A@
0C69  5000  A
0C6A  71F1  A
0C6B  2102  A
0C6C  C471  B
0C6D  2103  A
```

```
0C6E  8071  B
0C6F  611A  A
0C70  3100  A
0C71  5D07  A
0C72  4400  A
0C73  3400  A
0C74  2D20  A@
0C75  0600  A
0C76  8471  B
0C77  6514  A
0C78  5D07  A

0C79  3100  A
0C7A  8095  B
0C7B  5C0A  A
0C7C  1205  A
0C7D  806A  B
0C7E  1103  A
0C7F  3481  A
0C80  2D14  A@
0C81  0600  A
0C82  4500  A
0C83  8095  B
0C84  D106  A
0C85  A095  B
0C86  4700  A
0C87  0200  A

0C88  0030  A
0C89  003F  A
0C8A  001F  A
0C8B  0080  A
0C8C  FFE0  A

0C8D  8094  B
0C8E  A095  B
0C8F  4C20  A
0C90  29CE  A
0C91  43FF  A
0C92  21FC  A
0C93  0200  A
0C94  0EAE  T
0C95  0D86  T
0C96  0000  A
0C97  0000  A
0C98  0000  A
0C99  0000  A

0D74  5245  A
0D75  4420  A
0D76  6666  A
0D77  224D  A
0D78  4153  A
```

| | | | | |
|---|---|---|---|---|
| 0D79 | 2966 | A | 0DBC | 0400 A |
| 0D7A | 4352 | A | 0DBD | 4C00 A |
| 0D7B | 414E | A | 0DBE | A03A B |
| 0D7C | 4866 | A | 0DBF | 4FB4 A |
| 0D7D | 414C | A | 0DC0 | 0400 A |
| 0D7E | 5445 | A | 0DC1 | 140A A |
| 0D7F | 524E | A | 0DC2 | 4FB3 A |
| 0D80 | 4154 | A | 0DC3 | 0400 A |
| 0D81 | 4F52 | A | 0DC4 | 61DF A |
| 0D82 | 6666 | A | 0DC5 | C03A B |
| 0D83 | 4552 | A | 0DC6 | A03A B |
| 0D84 | 524F | A | 0DC7 | E1DD A |
| 0D85 | 5266 | A | 0DC8 | 21F6 A |
| | | | 0DC9 | 808C B |
| 0D86 | 4F9C | A | 0DCA | 8C8D B |
| 0D87 | 4000 | A | 0DCB | 0201 A |
| 0D88 | 0400 | A | 0DCC | 808C B |
| 0D89 | 1301 | A | 0DCD | 8C8D B |
| 0D8A | 21FD | A | 0DCE | 0200 A |
| 0D8B | 4400 | A | | |
| 0D8C | 0200 | A | | |
| | | | | |
| 0D8D | 8868 | B | | |
| | | | 0DCF | 4FA4 A |
| 0D8E | 3481 | A | 0DD0 | 813C A |
| 0D8F | 29F6 | A | | |
| 0D90 | 0600 | A | | 0002 |
| 0D91 | 710D | A | | 000B |
| 0D92 | 2107 | A | | 0002 |
| 0D93 | 29F2 | A | | 0003 |
| 0D94 | 4000 | A | | 0000 |
| 0D95 | 610A | A | | 0001 |
| 0D96 | C10A | A | | 0002 |
| 0D97 | 29EE | A | | 0003 |
| 0D98 | 0600 | A | | |
| 0D99 | 4400 | A | | |
| 0D9A | C103 | A | | |
| 0D9B | 4AFF | A | | |
| 0D9C | 21F2 | A | | |
| 0D9D | 0200 | A | | |
| | | | 1091 | A85E B |
| 0DAE | A070 | B | 1092 | AC5F B |
| 0DAF | 4C00 | A | 1093 | 7554 A |
| 0DB0 | A06B | B | 1094 | 3180 A |
| 0DB1 | 2DF0 | A@ | 1095 | 7552 A |
| 0DB2 | 293D | A | 1096 | 2101 A |
| 0DB3 | 2DEF | A@ | 1097 | 2103 A |
| 0DB4 | 806B | B | | |
| 0DB5 | 11FB | A | | |
| 0DB6 | 7C70 | B | | |
| 0DB7 | 21F7 | A | | |
| 0DB8 | 0200 | A | 1098 | 4DFF A |
| | | | 1099 | 4CFF A |
| 0DB9 | AC8D | B | 109A | 210D A |
| 0DBA | A08C | B | 109B | 4E00 A |
| 0DBB | 4FB8 | A | 109C | 4F10 A |
| | | | 109D | 5000 A |

| | | | | |
|---|---|---|---|---|
| 109E | 0A00 | A | 10C9 | 0A00 A |
| 109F | 5E01 | A | 10CA | 4C00 A |
| 10A0 | 1301 | A | 10CB | 5C01 A |
| 10A1 | 3600 | A | 10CC | 5D01 A |
| 10A2 | 5AFF | A | 10CD | 5A01 A |
| 10A3 | 5CFF | A | 10CE | 3881 A |
| 10A4 | 4BFF | A | 10CF | 5001 A |
| 10A5 | 21FA | A | 10D0 | 3C00 A |
| 10A6 | 3181 | A | 10D1 | 1B03 A |
| 10A7 | 3881 | A | 10D2 | 4C00 A |
| 10A8 | 8C5F | B | 10D3 | 5C01 A |
| 10A9 | 885E | B | 10D4 | 2104 A |
| 10AA | 0A80 | A | 10D5 | 5001 A |
| 10AB | 0200 | A | 10D6 | 3281 A |
| | | | 10D7 | 4CFF A |
| | | | 10D8 | 5C01 A |
| | | | 10D9 | 5901 A |
| | | | 10DA | 785D B |
| | | | 10DB | 21F1 A |
| 10AC | A85E | B | 10DC | 3481 A |
| | | | 10DD | 1201 A |
| 10AD | 3380 | A | 10DE | 2105 A |
| | | | 10DF | 3881 A |
| 10AE | 1207 | A | | |
| 10AF | 5CFF | A | 10E0 | 0A20 A |
| 10B0 | 3380 | A | 10E1 | 885E B |
| 10B1 | 5DFF | A | 10E2 | 8C5F B |
| 10B2 | 1301 | A | 10E3 | 0200 A |
| 10B3 | C534 | A | 10E4 | 8D02 A |
| 10B4 | 5CFF | A | 10E5 | 3F00 A |
| 10B5 | 2101 | A | 10E6 | 21F9 A |
| 10B6 | 3320 | A | 10E7 | 7000 A |
| 10B7 | 1502 | A | 10E8 | 8000 A |
| 10B8 | F5D4 | A | | 005E |
| 10B9 | 0200 | A | | 005F |
| | | | | 005E |
| 10BA | A060 | B | | 005F |
| 10BB | EC60 | B | | 005D |
| 10BC | 2101 | A | | 0060 |
| 10BD | 2103 | A | | |
| | | | | 10FE |
| | | | | 10E9 |
| 10BE | 4DFF | A | 10E9 | 0000 A |
| 10BF | 4CFF | A | 10EA | 0000 A |
| 10C0 | 211F | A | 10EB | 0000 A |
| 10C1 | 1201 | A | 10EC | 0000 A |
| 10C2 | 21FD | A | 10ED | 0000 A |
| 10C3 | 3281 | A | 10EE | 0000 A |
| 10C4 | 5001 | A | 10EF | 0000 A |
| 10C5 | 3C00 | A | 10F0 | 0000 A |
| 10C6 | 1B1D | A | 10F1 | 0000 A |
| 10C7 | 4CF0 | A | 10F2 | 0000 A |
| 10C8 | A05D | B | 10F3 | 0000 A |

```
10F4  0000  A
10F5  0000  A
10F6  0000  A
10F7  0000  A
10F8  0000  A
10F9  0000  A
10FA  0000  A
10FB  0000  A
10FC  0000  A
10FD  0000  A

10FE
10FE  2500  A
10FF  0100  T
```

Those skilled in the art will recognize that only selected embodiments of the present invention have been described, but that additional modifications of these embodiments would be obvious to those skilled in the art and would be within the spirit and scope of the appended claims.

What is claimed is:

1. A Apparatus for testing the compression of an internal combustion engine including a first chamber, a second chamber, a first member movable inside the first chamber in order to compress gas within the first chamber during a first time period, a second member movable inside the second chamber in order to compress gas within the second chamber during a second time period, a starter motor for moving the first and second members during a starting period and an electrical system for supplying an electrical power signal to rotate the starter motor during the starting period, and apparatus comprising:

converting means for generating a first group of discrete digital amplitude signals having values proportional to the amplitude of the electrical power signal at a plurality of discrete times during the first time period and for generating a second group of discrete digital amplitude signals having values proportional to the amplitude of the electrical power signal at a plurality of discrete times during the second time period;

processing means for selecting from the first group of discrete digital amplitude signals a first representative signal for representing the compression of the first chamber, for selecting from the second group of discrete digital signals a second representative signal for representing the compression of the second chamber and for generating relative compression digital signal having a value depending on the relative values of the first and second representative signals; and display means for displaying the value of the relative compression digital signal.

2. Apparatus, as claimed in claim 1, wherein the converting means comprises means for generating digital amplitude signals having values proportional to the current amplitude of the electrical power signal.

3. Apparatus, as claimed in claim 1, wherein the converting means comprises means for generating digital amplitude signals having values proportional to the voltage amplitude of the electrical power signal.

4. Apparatus, as claimed in claim 1, wherein the converting means comprises and analog-to-digital converter.

5. Apparatus, as claimed in claim 1, wherein the converting means generates the digital amplitude signals at the rate of at least 500 per second.

6. Apparatus, as claimed in claim 1, and further comprising timing means for generating and storing a digital timing signal corresponding to each digital amplitude signal and identifying the order in which the digital amplitude signals are generated.

7. apparatus, as claimed in claim 6, wherein the timing means comprises:
a memory location;
means for indexing the memory location in response to the generation of each digital amplitude signal; and
means for resetting the memory location to an initial value at the beginning of the first group and at the beginning of the second group.

8. Apparatus, as claimed in claim 6, wherein the first group of discrete digital amplitude signals comprises a first amplitude signal having a maximum value and a second amplitude signal having a minimum value within the first group and wherein the processor means comprises means for selecting the first amplitude signal as the first representative signal if the timing signals corresponding to the first and second amplitude signals indicate that the first amplitude signal occurred after the second amplitude signal and for selecting the second amplitude signal as the first representative signal if the timing signals corresponding to the first and second amplitude signals indicate that the first amplitude signal occured before the second amplitude signal.

9. Apparatus, as claimed in claim 8, wherein the second group of discrete digital amplitude signals comprises a third amplitude signal having a maximum value and a fourth amplitude signal having a minimum value within the second group and wherein the processor means comprises means for selecting the third amplitude signal as the second representative signal if the timing signals corresponding to the third and fourth amplitude signals indicate that the third amplitude signal occurred after the fourth amplitude signal and for selecting the fourth amplitude signal as the second representative signal if the timing signals corresponding to the third and fourth amplitude signals indicate that the third amplitude signal occurred before the fourth amplitude signal.

10. Apparatus, as claimed in claim 9, wherein the processor means comprises means for storing the first and second representative signals.

11. Apparatus, as claimed in claim 9, wherein the processor means comprises means for calculating the difference between the values of the first and second representative signals.

12. Apparatus, as claimed in claim 1, wherein the display means comprises a cathode ray tube.

13. Apparatus for testing the compression of an internal combustion engine including a plurality of N chambers, members movable within the chambers in order to compress gas within the chambers during N different time periods, a starter motor for moving the members inside the chambers during a starting period and an electrical system for supplying an electrical power signal to rotate the starter motor during the starting period, said apparatus comprising:

converting means for generating N groups of discrete digital amplitude signals having values proportional to the amplitude of the electrical power signal at a plurality of discrete times during the N time periods;

processor means for selecting from the N groups of discrete digital amplitude signals N representative signals $A_1$ through $A_N$ respectively representing the compression of the N chambers and for calculating a relative compression digital signal R according to the equation:

$$R = \sum_{J=1}^{N} \left[ 1 - \left( \sum_{K=1}^{N} \frac{|A_J - A_K|^{(Q)}}{N} \right) \right] \left( \frac{100}{N} \right)$$

where $Q$ is a constant.

14. Apparatus, as claimed in claim 13, and further comprising timing means for generating and storing a digital time signal corresponding to each digital amplitude signal and identifying the order in which the digital amplitude signals are generated.

15. Apparatus, as claimed in claim 14, wherein the timing means comprises:
    a memory location;
    means for indexing the memory location in response to the generation of each amplitude signal; and
    means for resetting the memory location to an initial value at the beginning of each of the N groups.

16. Apparatus, as claimed in claim 14, wherein each of the N groups of discrete digital amplitude signals includes a first amplitude signal having a maximum value and a second amplitude signal having a minimum value within the group and wherein the processor means comprises means for selecting the first amplitude signal in each group as the representative signal A for that group if the timing signals corresponding to the first and second amplitude signals indicate that the first amplitude signal occurred after the second amplitude signal and for selecting the second amplitude signal in each group as the representative signal A for that group if the timing signals corresponding to the first and second amplitude signals indicate that the first amplitude signal occurred before the second amplitude signal.

17. Apparatus as claimed in claim 13 wherein the engine employs ignition signals to sequentially ignite fuel-air mixtures in the chambers, and further comprising:
    means for generating a synchronizing signal in response to each ignition signal used to ignite the fuel-air mixture in a first one of the chambers;
    counting means for counting a synchronizing signal and each ignition signal occurring between two successive synchronizing signals; and
    memory means for storing the contents of the counting means after the number of chambers has been counted.

18. Apparatus, as claimed in claim 17, wherein the memory means comprises a separate memory location corresponding to each chamber and an additional memory location for storing the contents of the counting means, whereby data corresponding to each chamber can be separately stored.

19. Apparatus, as claimed in claim 18, wherein the processor means comprises a digital computer which disables the counting means in response to two successive synchronizing signals.

20. Apparatus, as claimed in claim 19, wherein the computer jumps to a preselected program subroutine in response to a hardware interrupt.

21. Apparatus, as claimed in claim 20, wherein the apparatus further comprises means for generating a cylinder signal during the occurrence of each ignition signal used to ignite the fuel-air mixture of a preselected chamber selected by the computer.

22. Apparatus, as claimed in claim 21, wherein a hardware interrupt occurs in response to the simultaneous generation of a cylinder signal and an ignition signal and wherein the counting means is advanced in response to the hardware interrupt.

23. Apparatus, as claimed in claim 17, and further comprising shorting means for preventing the ignition signals from occurring after the contents of the counting means has been transferred to the memory means, whereby the engine can be rotated without starting.

24. Apparatus, as claimed in claim 23, wherein the shorting means comprises a switching device operatively connected to the engine for preventing the ignition signals from occurring in response to a shorting signal.

25. Apparatus, as claimed in claim 24, wherein the processor means comprise means for generating the shorting signal after the contents of the counting means has been transferred to the memory means.

26. Apparatus, for automatically determining the number of chambers in an internal combustion engine in which ignition signals are used to sequentially ignite fuel-air mixtures in the chambers, said apparatus comprising:
    means for generating a synchronizing signal in response to each ignition signal used to ignite the fuel-air mixture in a first one of the chambers;
    counting means for counting a synchronizing signal and each ignition signal occurring between two successive synchronizing signals;
    memory means for storing digital data; and
    processing means for transferring the contents of the counting means to the memory means after the number of chambers has been counted.

27. Apparatus, as claimed in claim 26, wherein the memory means comprises a separate memory location corresponding to each chamber and an additional memory location for storing the contents of the counting means, whereby data corresponding to each chamber can be separately stored.

28. Apparatus, as claimed in claim 27, wherein the processing means comprises a digital computer which disables the counting means in response to two successive synchronizing signals.

29. Apparatus, as claimed in claim 28, wherein the computer jumps to a preselected program subroutine in response to a hardware interrupt.

30. Apparatus, as claimed in claim 29, wherein the apparatus further comprises means for generating a cylinder signal during the occurrence of each ignition signal used to ignite the fuel-air mixture of a preselected chamber selected by the computer.

31. Apparatus, as claimed in claim 30, wherein a hardware interrupt occurs in response to the simultaneous generation of a cylinder signal and an ignition signal and wherein the counting means is advanced in response to the hardware interrupt.

32. Apparatus, as claimed in claim 26, and further comprising shorting means for preventing the ignitions signals from occurring after the contents of the counting means has been transferred to the memory means, whereby the engine can be rotated without starting.

33. Apparatus, as claimed in claim 32, wherein the shorting means comprises a switching device operatively connected to the engine for preventing the ignition signals from occurring in response to a shorting signal.

34. Apparatus, as claimed in claim 33, wherein the processor means comprise means for generating the shorting signal after the contents of the counting means has been transferred to the memory means.

* * * * *